US012582267B2

(12) United States Patent
Snediker et al.

(10) Patent No.: US 12,582,267 B2
(45) Date of Patent: Mar. 24, 2026

(54) NON-MOTORIZED DRY FOOD DISPENSING APPARATUS

(71) Applicant: CHICAGO SHOW, INC., Eau Claire, MI (US)

(72) Inventors: James M. Snediker, Dowagiac, MI (US); Raymond Gradecki, Mundelein, IL (US)

(73) Assignee: CHICAGO SHOW, INC., Eau Claire, MI (US)

( * ) Notice: Subject to any disclaimer, the term of this patent is extended or adjusted under 35 U.S.C. 154(b) by 0 days.

(21) Appl. No.: 18/141,823

(22) Filed: May 1, 2023

(65) Prior Publication Data

US 2023/0270292 A1 Aug. 31, 2023

Related U.S. Application Data

(63) Continuation-in-part of application No. 17/326,924, filed on May 21, 2021, now Pat. No. 11,753,255, which is a continuation-in-part of application No. 16/746,163, filed on Jan. 17, 2020, now Pat. No. 11,089,894.

(60) Provisional application No. 62/794,095, filed on Jan. 18, 2019.

(51) Int. Cl.
| | |
|---|---|
| *A47J 47/01* | (2006.01) |
| *A47F 10/02* | (2006.01) |
| *A47J 47/02* | (2006.01) |
| *B65D 83/00* | (2006.01) |
| *B65D 83/06* | (2006.01) |

(52) U.S. Cl.
CPC ............... *A47J 47/01* (2013.01); *A47F 10/02* (2013.01); *A47J 47/02* (2013.01); *B65D 83/06* (2013.01); *B65D 83/775* (2025.01)

(58) Field of Classification Search
USPC ........................................................ 220/4.21
See application file for complete search history.

(56) References Cited

U.S. PATENT DOCUMENTS

| | | | | |
|---|---|---|---|---|
| 480,146 A | * | 8/1892 | Souder ..................... | A01C 7/18 |
| | | | | 422/523 |
| 533,255 A | | 1/1895 | Warner | |
| 534,361 A | * | 2/1895 | Courtney ................. | A01C 7/04 |
| | | | | 221/265 |
| 930,736 A | | 8/1909 | Davis | |
| 1,022,774 A | * | 4/1912 | De Julio ................. | G01F 11/24 |
| | | | | 222/368 |

(Continued)

*Primary Examiner* — Paul R Durand
*Assistant Examiner* — Michael J. Melaragno
(74) *Attorney, Agent, or Firm* — Barnes & Thornburg LLP

(57) ABSTRACT

The present invention provides a new bulk, dry foods dispensing apparatus and system for commercial, retail and home use designed to dispense a predetermined volume of dry bulk food into a bowl or other receptacle without crushing or breaking the food. The bulk food dispenser includes a hopper, a feed house including two or more openings, and a feed wheel located within the feed house, where the feed wheel further includes a plurality of protrusions for directing a solid material out of the hopper when the feed wheel is rotated, where at least one of the two or more openings receive the solid material directed by a baffle, and where at least one of the two or more openings dispense the solid material out of the feed house.

18 Claims, 24 Drawing Sheets

(56) References Cited

U.S. PATENT DOCUMENTS

| | | | | |
|---|---|---|---|---|
| 1,617,922 A | * | 2/1927 | Morrison | B67D 3/00 |
| | | | | 222/452 |
| 1,639,415 A | | 8/1927 | Poplawski | |
| 1,717,025 A | * | 6/1929 | Green | A47K 5/10 |
| | | | | 222/224 |
| 1,892,992 A | * | 1/1933 | Moran | G01F 11/24 |
| | | | | 222/181.1 |
| 1,940,751 A | | 12/1933 | Herman | |
| 1,966,326 A | | 7/1934 | Wentorf | |
| 1,974,316 A | | 9/1934 | Schoening | |
| 2,122,695 A | * | 7/1938 | Podwyszynski | A47K 5/10 |
| | | | | 222/368 |
| 2,211,452 A | * | 8/1940 | Bowman | A47F 1/035 |
| | | | | 222/452 |
| 2,315,244 A | * | 3/1943 | Campbell, Jr. | B65D 83/06 |
| | | | | 222/368 |
| 2,315,473 A | | 3/1943 | Wolcott | |
| 2,330,256 A | | 9/1943 | Ashton | |
| 2,446,582 A | | 8/1948 | Gopner | |
| 2,518,520 A | * | 8/1950 | Broun | G01F 11/24 |
| | | | | 222/368 |
| 2,575,967 A | * | 11/1951 | May | A47G 19/34 |
| | | | | 222/39 |
| 2,584,781 A | * | 2/1952 | Beatty | G01F 11/24 |
| | | | | 222/242 |
| 2,754,995 A | | 7/1956 | Switzer | |
| 2,877,937 A | | 3/1959 | Weir | |
| 2,901,150 A | | 8/1959 | Gustave | |
| 2,920,796 A | | 1/1960 | Field | |
| 2,944,707 A | * | 7/1960 | Steinmetz | G01F 11/24 |
| | | | | 222/362 |
| 3,131,821 A | | 5/1964 | Keiji | |
| 3,211,334 A | * | 10/1965 | Mcshea | A47G 19/34 |
| | | | | 222/452 |
| 3,249,266 A | * | 5/1966 | Lawrence | A47G 19/34 |
| | | | | 222/362 |
| 3,367,544 A | | 2/1968 | Frank | |
| 3,450,310 A | | 6/1969 | Dayton | |
| 3,754,686 A | | 8/1973 | Karlen | |
| 3,970,244 A | | 7/1976 | Chatham | |
| 3,991,908 A | * | 11/1976 | Thomas | B65D 83/0409 |
| | | | | 221/265 |
| 4,268,205 A | | 5/1981 | Vacca | |
| 4,322,017 A | * | 3/1982 | Lowdermilk | G01F 11/24 |
| | | | | 222/242 |
| 4,427,136 A | | 1/1984 | MacKay | |
| 4,508,473 A | | 4/1985 | Richter | |
| 4,511,067 A | | 4/1985 | Martin | |
| 4,569,463 A | * | 2/1986 | Pellegrino | A47G 19/34 |
| | | | | 222/434 |
| 4,674,660 A | * | 6/1987 | Botto | G01F 11/24 |
| | | | | 222/305 |
| 4,823,993 A | * | 4/1989 | Siegel | B65G 53/4633 |
| | | | | 222/368 |
| 4,832,235 A | * | 5/1989 | Palmer | G01F 11/24 |
| | | | | 222/548 |
| RE33,083 E | * | 10/1989 | Pellegrino | G01F 11/20 |
| | | | | 222/434 |
| 4,892,233 A | * | 1/1990 | Zelickson | B65D 83/06 |
| | | | | 141/144 |
| 4,957,219 A | * | 9/1990 | Robbins | G01F 11/24 |
| | | | | 222/39 |
| 5,109,893 A | | 5/1992 | Derby | |
| 5,114,053 A | | 5/1992 | Beirle | |

| | | | | |
|---|---|---|---|---|
| 5,253,535 A | * | 10/1993 | McCown | G01F 11/24 |
| | | | | 250/435 |
| 5,303,672 A | * | 4/1994 | Morris | A01K 61/80 |
| | | | | 222/650 |
| 5,529,221 A | * | 6/1996 | Roy | A47G 19/34 |
| | | | | 222/427 |
| 5,735,422 A | * | 4/1998 | Binter | B65D 21/0204 |
| | | | | 220/523 |
| 5,791,526 A | * | 8/1998 | Landais | A47J 31/404 |
| | | | | 222/325 |
| 5,934,516 A | * | 8/1999 | Strycharske | G01F 11/24 |
| | | | | 222/239 |
| 6,123,486 A | * | 9/2000 | Wilms | B65D 88/68 |
| | | | | 406/67 |
| 6,131,772 A | * | 10/2000 | Robbins | A47F 1/035 |
| | | | | 220/675 |
| 6,176,397 B1 | * | 1/2001 | Robbins | A47F 1/035 |
| | | | | 222/368 |
| 6,237,816 B1 | * | 5/2001 | Boritzki | G01B 7/023 |
| | | | | 222/1 |
| 6,321,802 B1 | | 11/2001 | Weeks | |
| 6,779,691 B2 | * | 8/2004 | Cheng | B65G 65/4881 |
| | | | | 222/368 |
| 7,090,098 B2 | | 8/2006 | Livingston | |
| 7,461,763 B1 | * | 12/2008 | Winn | B65G 65/46 |
| | | | | 222/413 |
| 7,597,219 B2 | * | 10/2009 | O'Leary | B65G 53/4633 |
| | | | | 222/368 |
| 7,874,457 B2 | | 1/2011 | Sowers | |
| 8,047,408 B2 | * | 11/2011 | Eaton | G01F 11/24 |
| | | | | 222/410 |
| 8,069,887 B2 | | 12/2011 | Dirnberger | |
| 8,584,901 B2 | * | 11/2013 | Dooley | A47J 31/401 |
| | | | | 222/242 |
| 9,500,509 B2 | * | 11/2016 | Egnor, Jr. | G01F 11/24 |
| 9,587,972 B2 | * | 3/2017 | Landau | B01F 27/82 |
| 11,051,636 B2 | * | 7/2021 | Sunesson | A47F 1/03 |
| 11,089,894 B2 | * | 8/2021 | Snediker | A47J 47/01 |
| 11,370,604 B1 | * | 6/2022 | Gold | B65D 83/06 |
| 11,753,255 B2 | * | 9/2023 | Snediker | A47G 19/34 |
| | | | | 222/368 |
| 2003/0234264 A1 | * | 12/2003 | Landau | A47G 19/34 |
| | | | | 222/368 |
| 2006/0027609 A1 | * | 2/2006 | Landau | G01F 11/18 |
| | | | | 222/434 |
| 2006/0043115 A1 | | 3/2006 | Tanaka | |
| 2006/0249531 A1 | * | 11/2006 | Litchfield | G07F 11/44 |
| | | | | 222/363 |
| 2007/0138211 A1 | * | 6/2007 | O'Leary | B65G 53/4633 |
| | | | | 222/368 |
| 2007/0187433 A1 | * | 8/2007 | Webster | G01F 11/46 |
| | | | | 222/333 |
| 2007/0194056 A1 | * | 8/2007 | Webster | G01F 11/46 |
| | | | | 222/333 |
| 2010/0012684 A1 | * | 1/2010 | Eaton | G01F 11/24 |
| | | | | 222/370 |
| 2010/0101401 A1 | | 4/2010 | Toeckes | |
| 2010/0320236 A1 | * | 12/2010 | Hassan | A47G 19/34 |
| | | | | 222/368 |
| 2014/0144926 A1 | | 5/2014 | Wolf | |
| 2015/0253172 A1 | * | 9/2015 | Landau | B01F 23/60 |
| | | | | 222/1 |
| 2018/0155141 A1 | * | 6/2018 | Brundick | B65D 88/66 |
| 2020/0275791 A1 | * | 9/2020 | Snediker | G01F 13/001 |
| 2021/0106147 A1 | * | 4/2021 | Sunesson | A47F 1/03 |
| 2021/0347583 A1 | * | 11/2021 | Snediker | A47G 19/34 |
| 2023/0270292 A1 | * | 8/2023 | Snediker | A47F 1/03 |
| | | | | 222/414 |

* cited by examiner

191

191

191

191

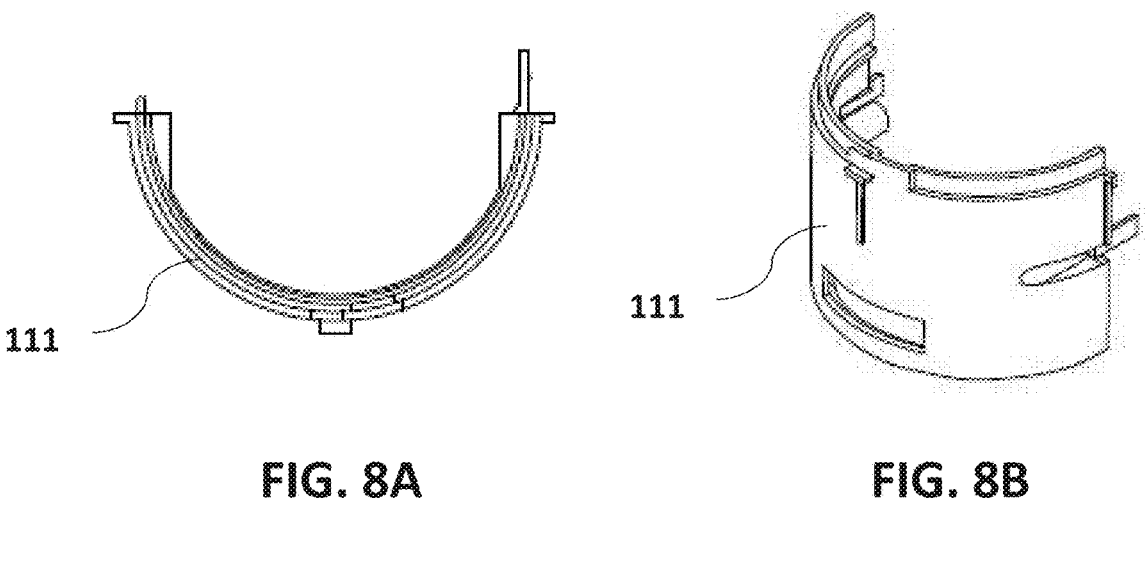
FIG. 8A                    FIG. 8B
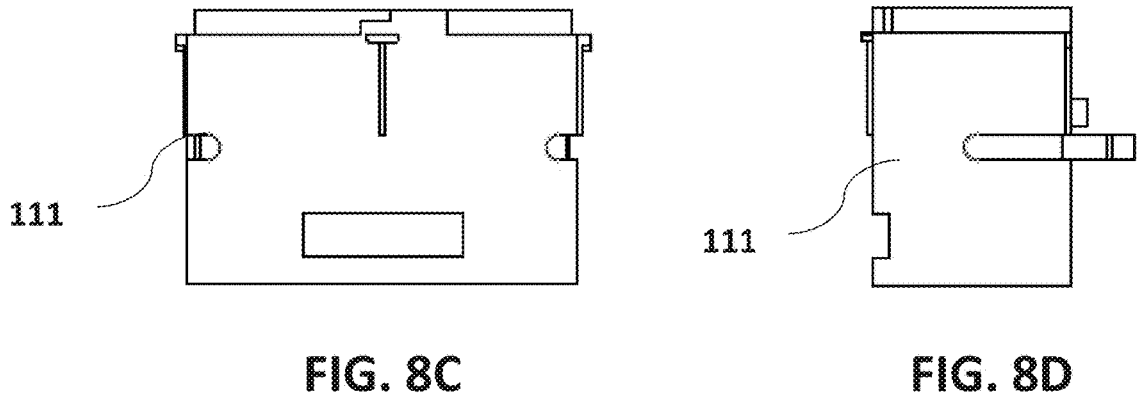
FIG. 8C                    FIG. 8D

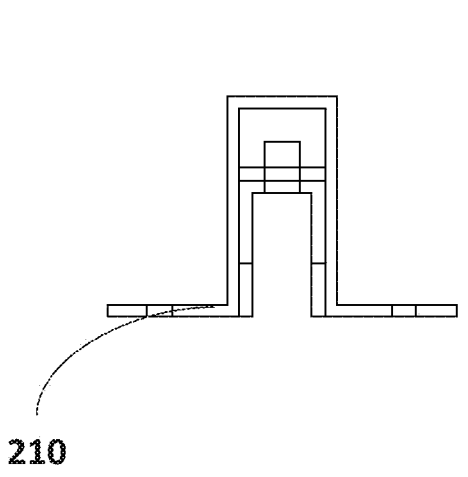
210
FIG. 16A
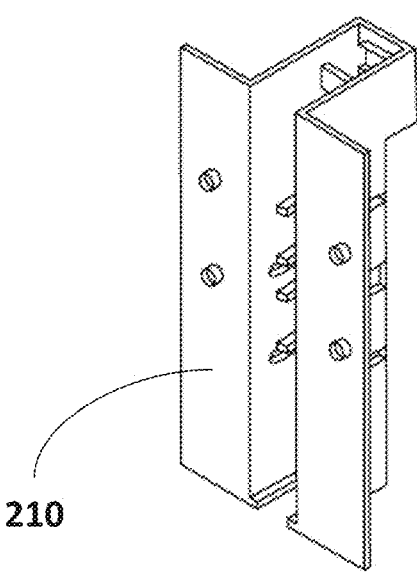
210
FIG. 16B
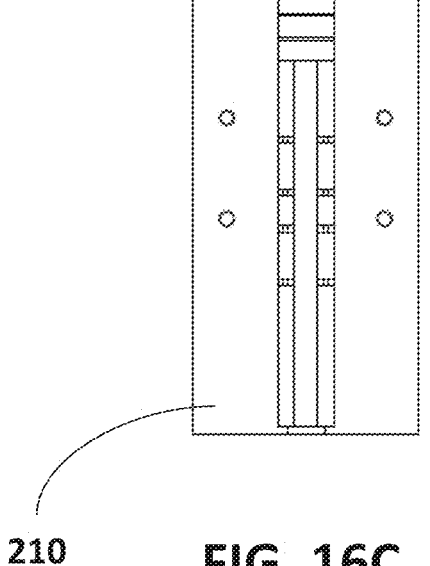
210          FIG. 16C
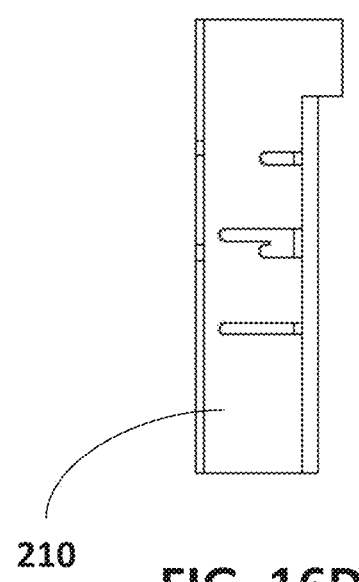
210          FIG. 16D

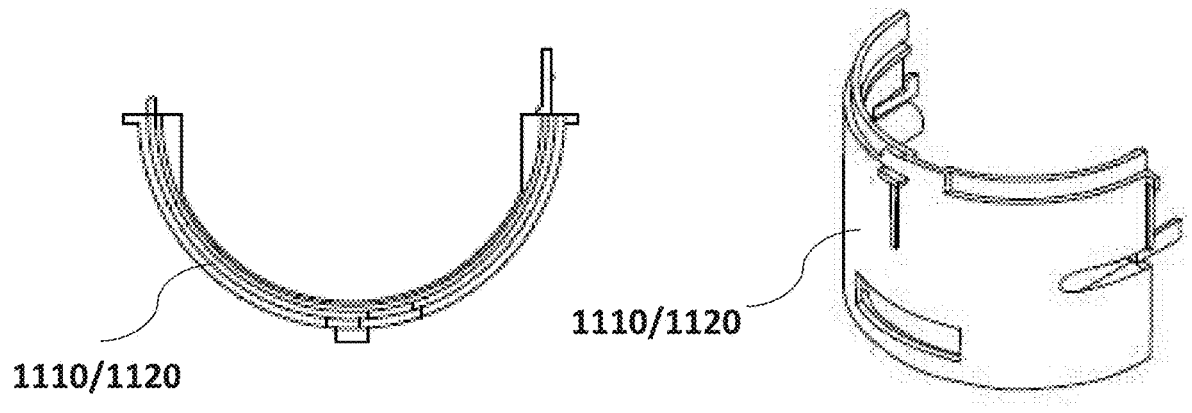
1110/1120
1110/1120
FIG. 21A
FIG. 21B
1110/1120
1110/1120
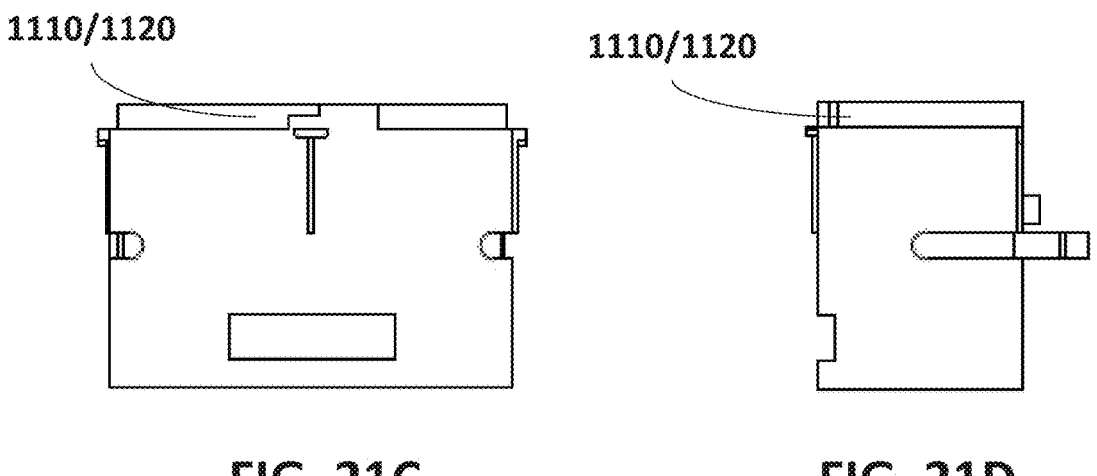
FIG. 21C
FIG. 21D

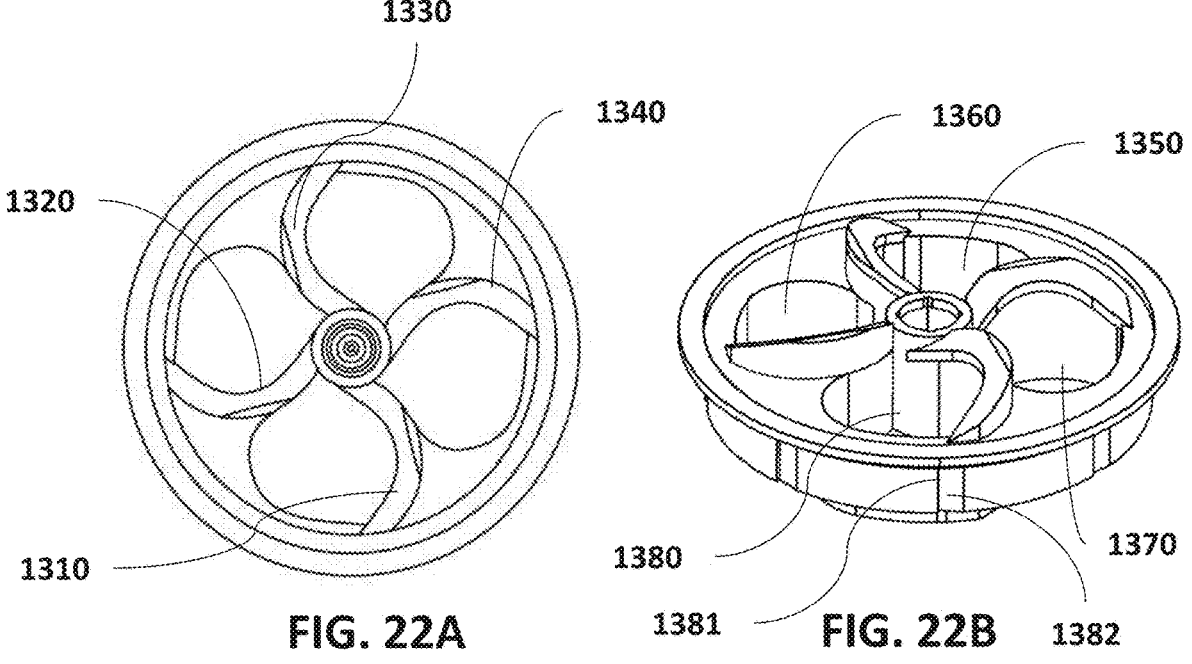
FIG. 22A
FIG. 22B
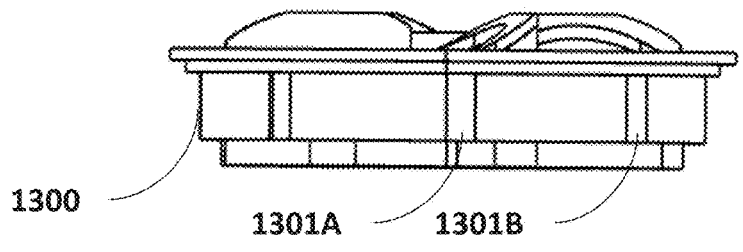
FIG. 22C

1400

1400

1400

1400

2401

2402

NON-MOTORIZED DRY FOOD DISPENSING APPARATUS

CROSS-REFERENCE TO RELATED APPLICATIONS

This application is a continuation-in-part of U.S. patent application Ser. No. 17/326,924, filed on May 21, 2021, which is a continuation-in-part of U.S. patent application Ser. No. 16/746,163, filed on Jan. 17, 2020 (now U.S. Pat. No. 11,089,894), which claims priority to U.S. Provisional Patent Application No. 62/794,095, filed on Jan. 18, 2019, all of which are incorporated herein by reference.

BACKGROUND

The present invention generally relates to bulk dispensers for comestibles, particularly to bulk dispensers for ready-to-eat cereals, and specifically to bulk dispensers for comestibles that minimize the generation of material fines due to material breakage and rough handling.

Conventionally, ready-to-eat cereal is often dispensed in bulk form at dormitories, hotels, and other commercial institutions from slide type dispensers. However, such dispensers dispense only one predetermined volume that could be too little or too much for the particular person or the bowl that he or she is using. Other alternative designs that continuously dispense dry foods dispense the food too fast and therefore create waste.

Alternatively, using a scoop to dispense dry foods is also undesirable as it increases the risk of contaminating the dry food remaining inside the storage container.

Other known dispensing systems such as those disclosed in U.S. Pat. Nos. 7,461,763 and 5,826,754 use a pivotal auger mechanism to dispense the dry food from an internal storage compartment. However, these auger systems tend to crush more delicate dry foods, such as flake type cereal.

SUMMARY OF THE INVENTION

The present invention provides a dry foods dispensing system for commercial, retail, and home use. This unique new invention differs in several ways from the prior art. In an embodiment described herein, a lever is used to engage a feed wheel to dispense material. This is advantageous for applications where electrical connections are unavailable, or if a user desires few components to have to clean and sanitize.

In one aspect of certain embodiments of the invention, the system includes a unique set of interior baffles on a rotating feed wheel to ensure there is a controlled flow of material from a storage hopper through a dispensing chamber and eliminates bridging or damming of a material. Additionally, in certain embodiments of the invention, the lever actuates the feed wheel to enable smooth controlled dispensing of material from the storage hopper into a user's container.

Sweeping protrusions operate with dispensing sections, a dispensing apparatus assembly, and a feed wheel to dispense dry food material without jamming or agglomeration of the dry food material.

In certain embodiments, the present invention is more compact in size in the dispensing area and therefore reduces the amount of space required on the counter than prior known dispensers.

BRIEF DESCRIPTION OF THE DRAWINGS

FIG. 8A shows a top view of a feed house collar of the embodiment of FIG. 1.

FIG. 8B shows a perspective view of the feed house collar of FIG. 8A.

FIG. 8C shows a front view of the feed house collar of FIG. 8A.

FIG. 8D shows a side view of the feed house collar of the embodiment of FIG. 8A.

FIG. 10C shows a front view of the first side of a motor house of FIG. 10A.

FIG. 10D shows a side view of the first side of a motor house of FIG. 10A.

FIG. 16A shows a top view of a switch channel of the embodiment of FIG. 1.

FIG. 16B shows a perspective view of the switch channel of FIG. 16A.

FIG. 16C shows a front view of the switch channel of FIG. 16A.

FIG. 16D shows a side view of the switch channel of FIG. 16A.

FIG. 21A shows a top view of a feed house collar of the embodiment of FIG. 17.

FIG. 21B shows a perspective view of the feed house collar of FIG. 21A.

FIG. 21C shows a front view of the feed house collar of FIG. 21A.

FIG. 21D shows a side view of the feed house collar of the embodiment of FIG. 21A.

FIG. 22A shows a top view of a feed wheel of the embodiment of FIG. 17.

FIG. 22B shows a perspective view of the feed wheel of FIG. 22A.

FIG. 22C shows a front view of the feed wheel of the embodiment of FIG. 22A.

DETAILED DESCRIPTION

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

Figure 1:
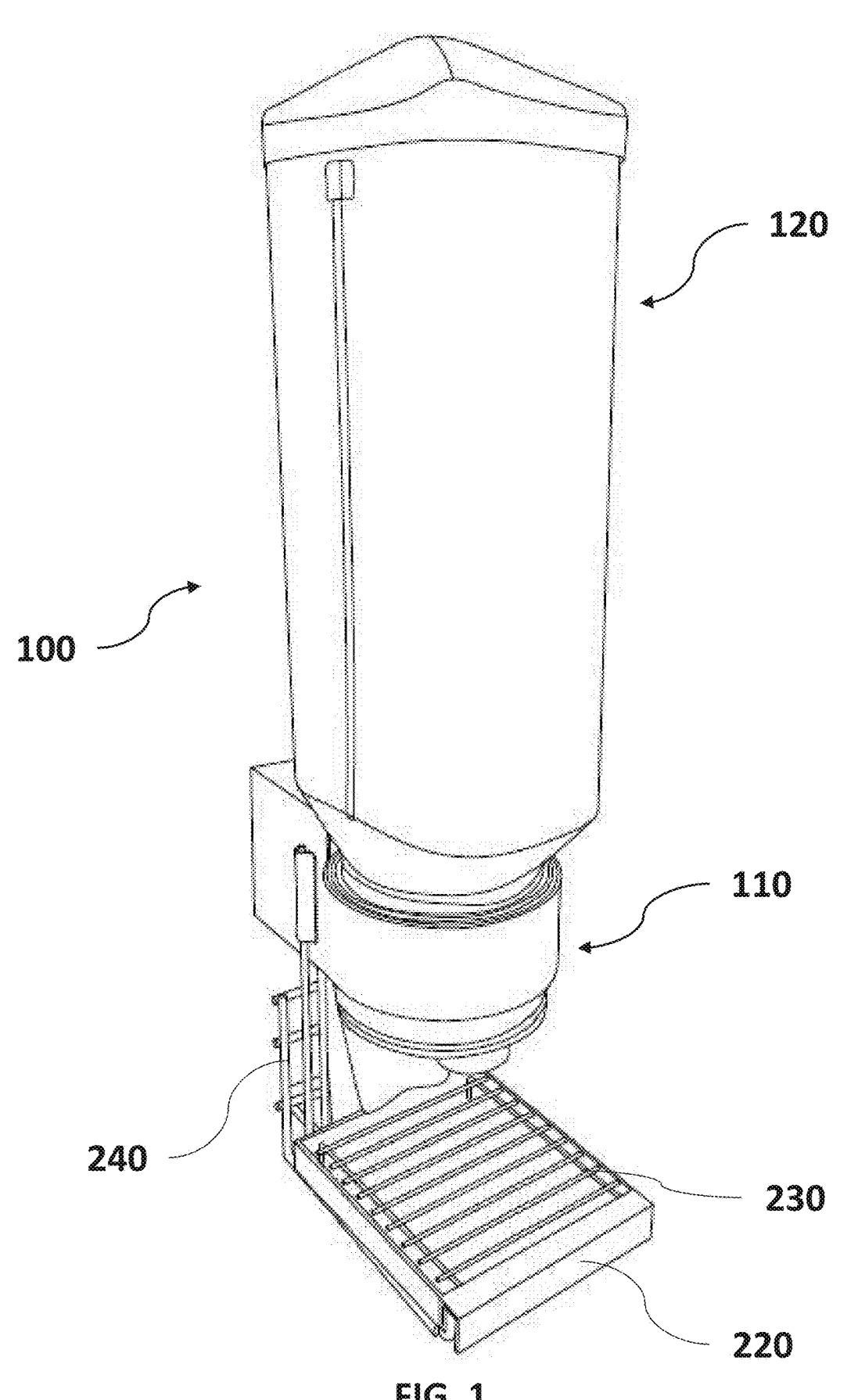
FIG. 1 shows a perspective view of a first embodiment of the present invention.
Figure 2:
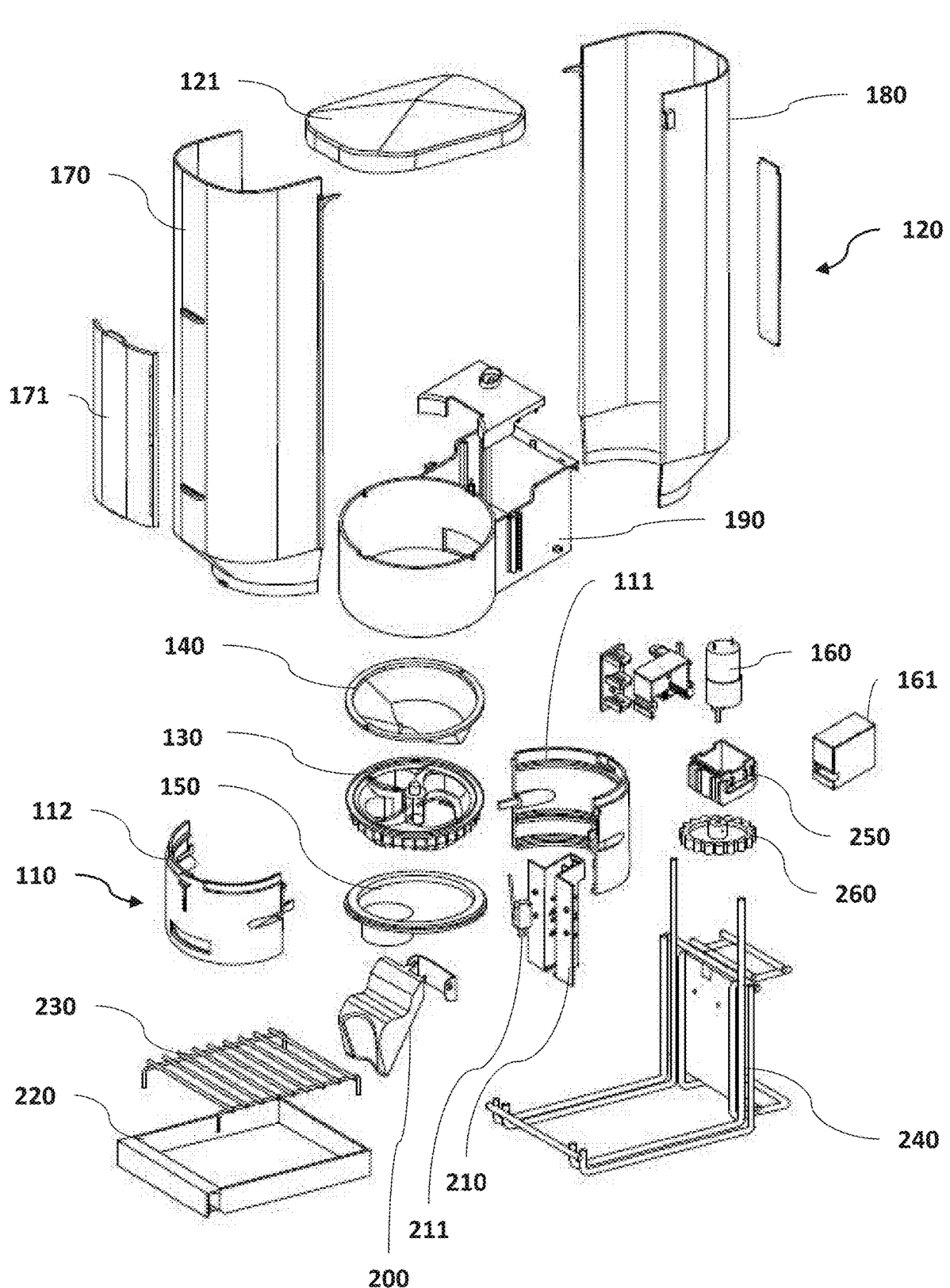
FIG. 2 shows an exploded view of the embodiment of FIG. 1.

Turning first to FIG. 1, an assembled view of an embodiment of a dispensing apparatus assembly 100 is shown. A source container for storing material, shown as a hopper 120, is located above a feed house assembly 110. The hopper 120 contains a cavity in which the material is stored. Material stored in the hopper 120 is gravity fed from the hopper 120 to the feed house assembly in an illustrative embodiment. As shown in FIG. 2, in some embodiments, there is a funnel 140 internal to the feed house assembly 110 which directs material from the hopper 120 to a feed wheel 130. The feed wheel 130 rotates dispensing material into the user's container via a chute 150 located below the feed wheel.

FIG. 2 shows an exploded view of an embodiment of dispensing apparatus assembly 100. As shown in FIG. 2, the hopper 120 may be comprised of a first side 170 and a second side 180 mechanically connected to one another to form an upper storage portion to retain bulk solid material to be dispensed. Once the hopper 120 is filled with a material, for instance a cereal, the material is gravity fed through the hopper 120 to the funnel 140, which is located in the feed house assembly 110. The funnel 140 directs the material housed in the hopper 120 via gravity towards the feed wheel 130 in the feed house assembly 110. The feed wheel 130 is enclosed within two feed house collars 111-112. Below the feed wheel 130 is the chute 150 to direct the flow of the material swept with the feed wheel 130 to the opening in the chute 150. There is a removable cap 121 located atop the hopper 120 that allows the dispenser apparatus assembly 100 to be refilled, and prevent contamination of the material when it is full and in use.

Additionally, FIG. 2 shows a wire base 240 of an embodiment which supports the hopper 120, a motor assembly 165, and a feed house assembly 110. The wire base 240 supports the hopper 120 and suspends it above a wire grate 230 and a removable crumb tray 220. In some embodiments, the wire grate 230 is designed to support the user's container as it is filled with material, such as cereal, while permitting excess material to fall through and be captured in the crumb tray 220. The crumb tray 220 thereby allows for quick cleaning of the area directly below the opening in the wire grate 230. Quick cleaning is facilitated by the removal of the wire grate 230 and crumb tray 220 from the wire base 240. Both the wire grate 230 and crumb tray 220 can be machine washed and are coupled mechanically to the wire base 240 to facilitate easy removal with no tools required.

Figure 5:
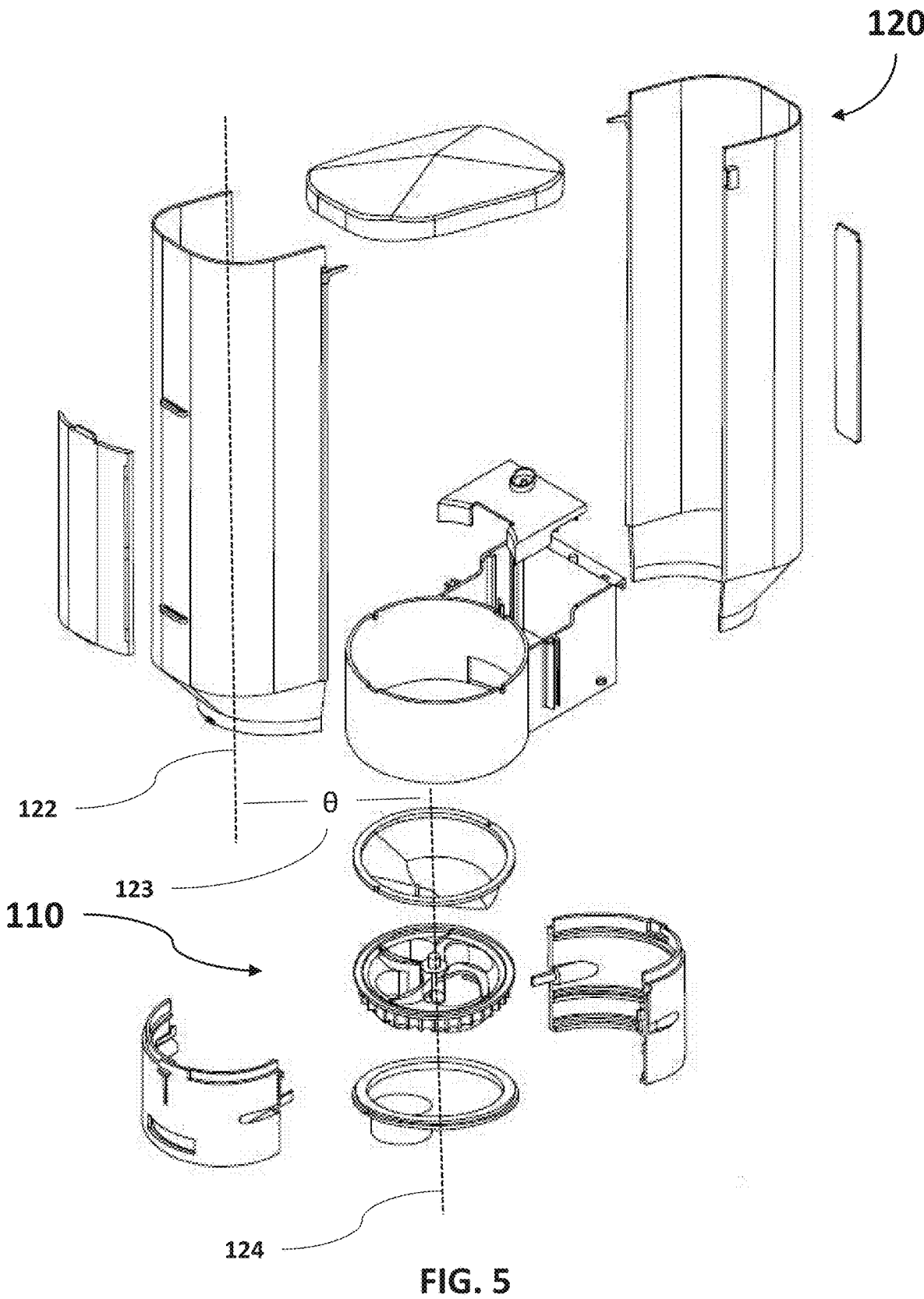
FIG. 5 shows an exploded view of a feed house assembly and a hopper assembly of the embodiment of FIG. 1.

In the embodiment shown in FIG. 5, it is noted that the axis 124 of the feed wheel 130 is substantially parallel to the axis 122 of the hopper 120. In some embodiments, material stored in the hopper 120 passes via gravity feed through the feed wheel 130, which portions and controls the flow of material, and into the chute 150 to be dispensed into the user's container. It is expressly contemplated that the angle of the axis 124 of the feed wheel 130 compared to the vertical axis 122 of the hopper need not be 0° as illustrated in FIG. 5. In at least some embodiments, this angle is an acute angle ranging from 0-89° depending on the embodiment.

Figure 3:
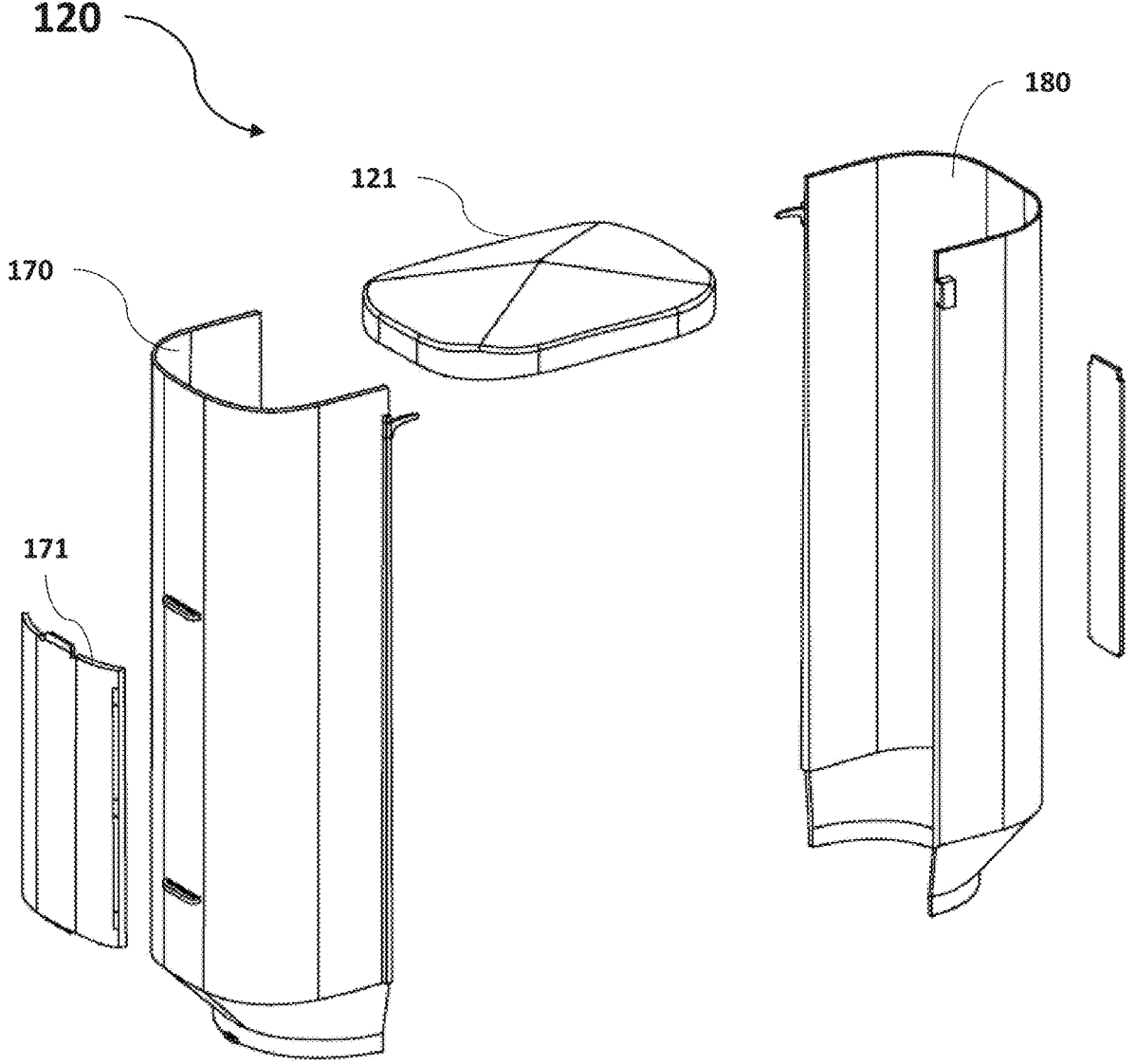
FIG. 3 shows an exploded view of a hopper assembly of the embodiment of FIG. 1.

Turning to FIG. 3, an exploded view of the hopper 120 is shown. As shown in FIG. 3, in some embodiments, there is a detachable plaque 171 attached to the first side 170 of the hopper 120 that allows the material's name and branding to be displayed for the user to see prior to depressing the lever 200 to engage the drive assembly 165.

Figure 4:
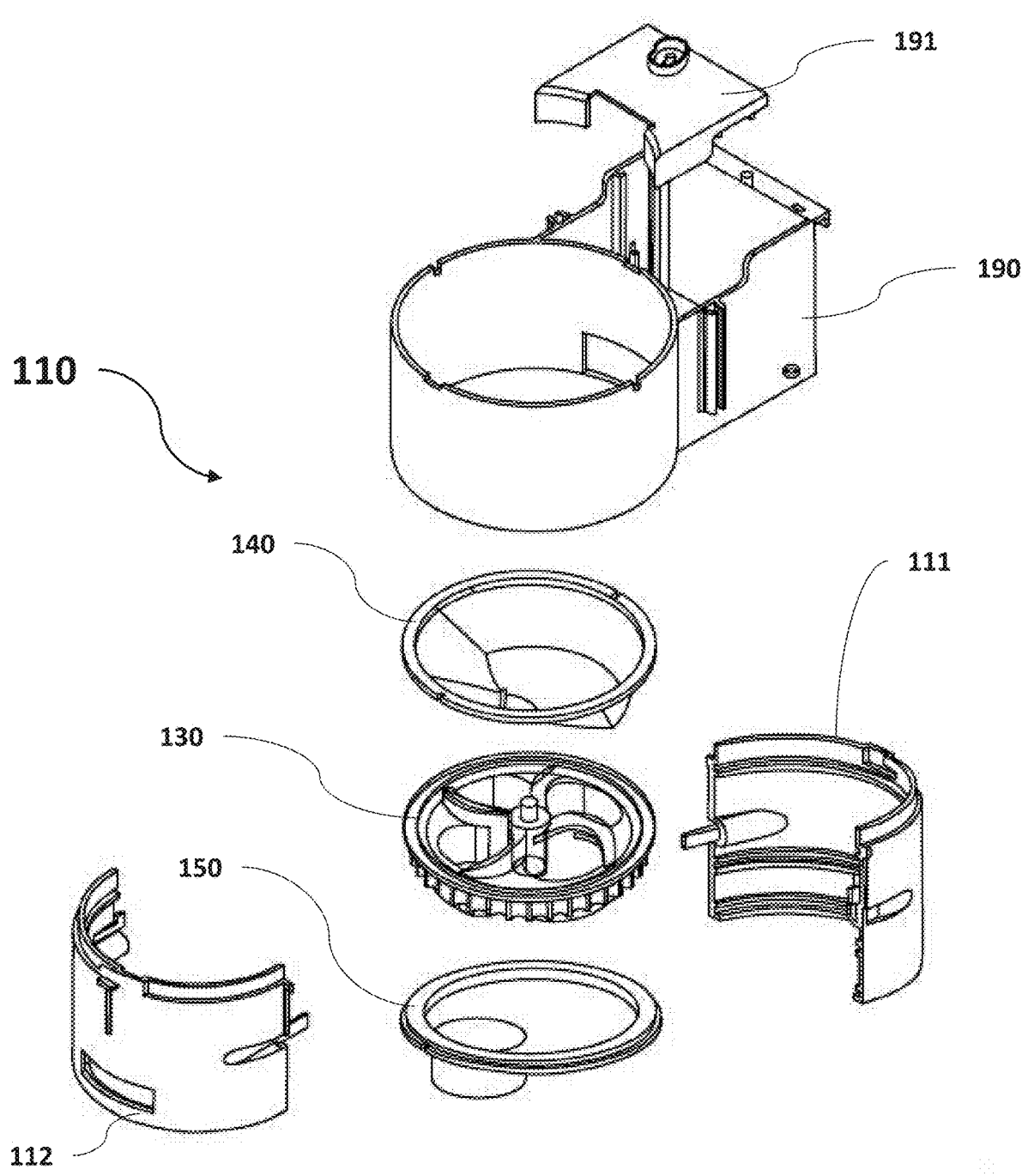
FIG. 4 shows an exploded view of a feed house assembly of the embodiment of FIG. 1.

FIG. 4 shows an exploded view of the feed house assembly 110. The feed house assembly 110 is located below the hopper 120, and houses funnel 140, feed wheel 130, and chute 150. Material that is stored in bulk in the hopper 120 passes through the funnel 140 and into the feed wheel 130. The feed wheel 130 has a ring of gear teeth that are acted on by the motor 160 to turn the feed wheel about a central axis (not shown in FIG. 4), to convey material from the hopper 120 into the chute 150. In certain embodiments, the chute 150 deposits the conveyed material into the user's container. The feed house assembly further comprises at least one or more feed house collars 111-112 which retain the components of the feed house assembly 110 into a saddle 190. In a first embodiment, the saddle 190 holds all components of the feed house assembly 110 and is coupled to a base 240 and a hopper 120 (as previously described and shown in FIG. 1). The feed house assembly 110 additionally comprises a feed house cap 191 to further seal the feed house assembly 110 from the material in the hopper 120. FIGS. 7A-D show the feed house cap 191 in greater detail.

FIG. 5 shows the hopper 120, used in some embodiments, in a position relative to the feed house assembly 110. The hopper 120 is located upstream of the feed house assembly 110 to ensure smooth operation of the gravity fed system in some embodiments.

Figure 6:
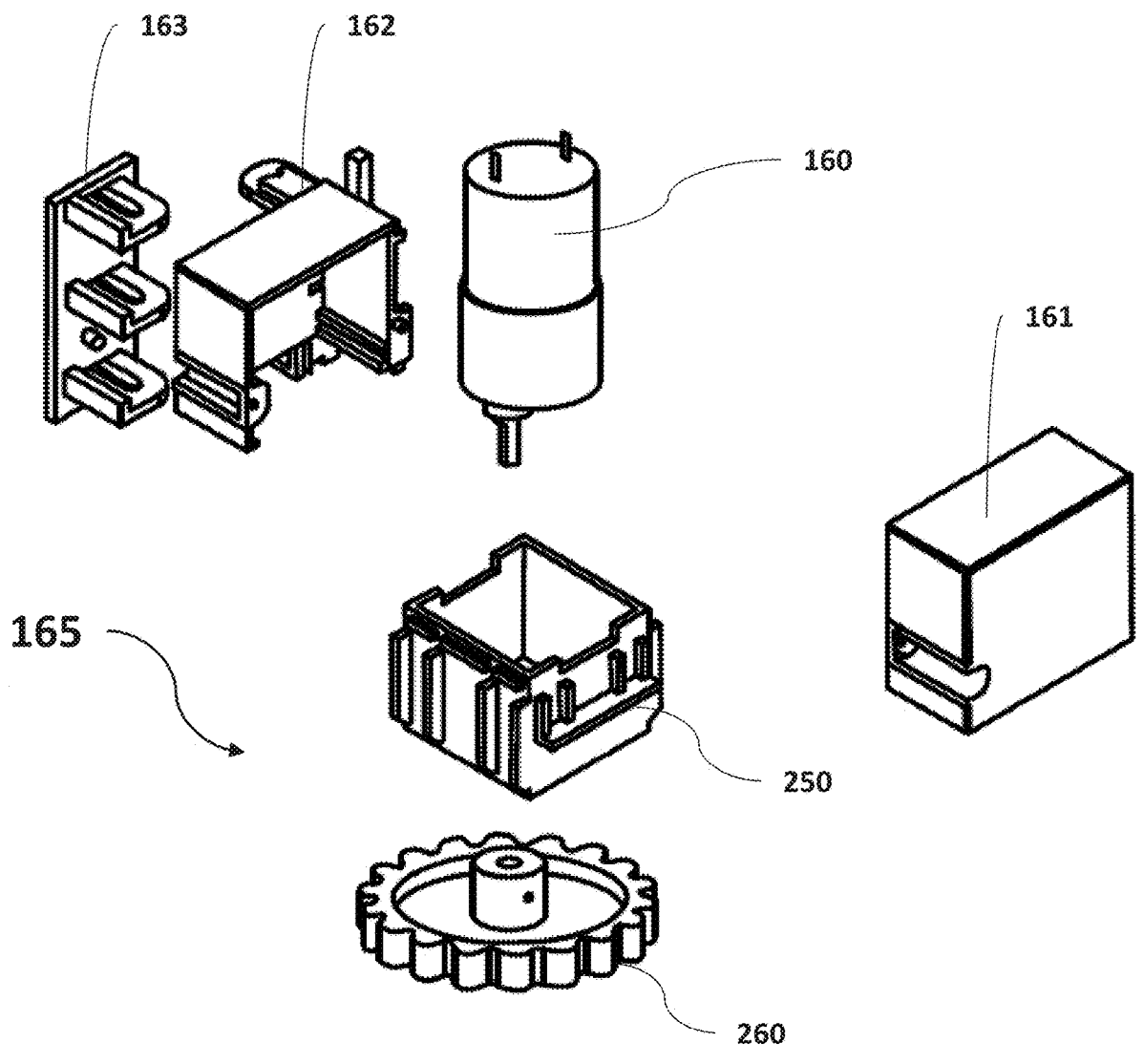
FIG. 6 shows an exploded view of a drive assembly of the embodiment of FIG. 1.
Figures 7A, 7B, 7C, 7D:
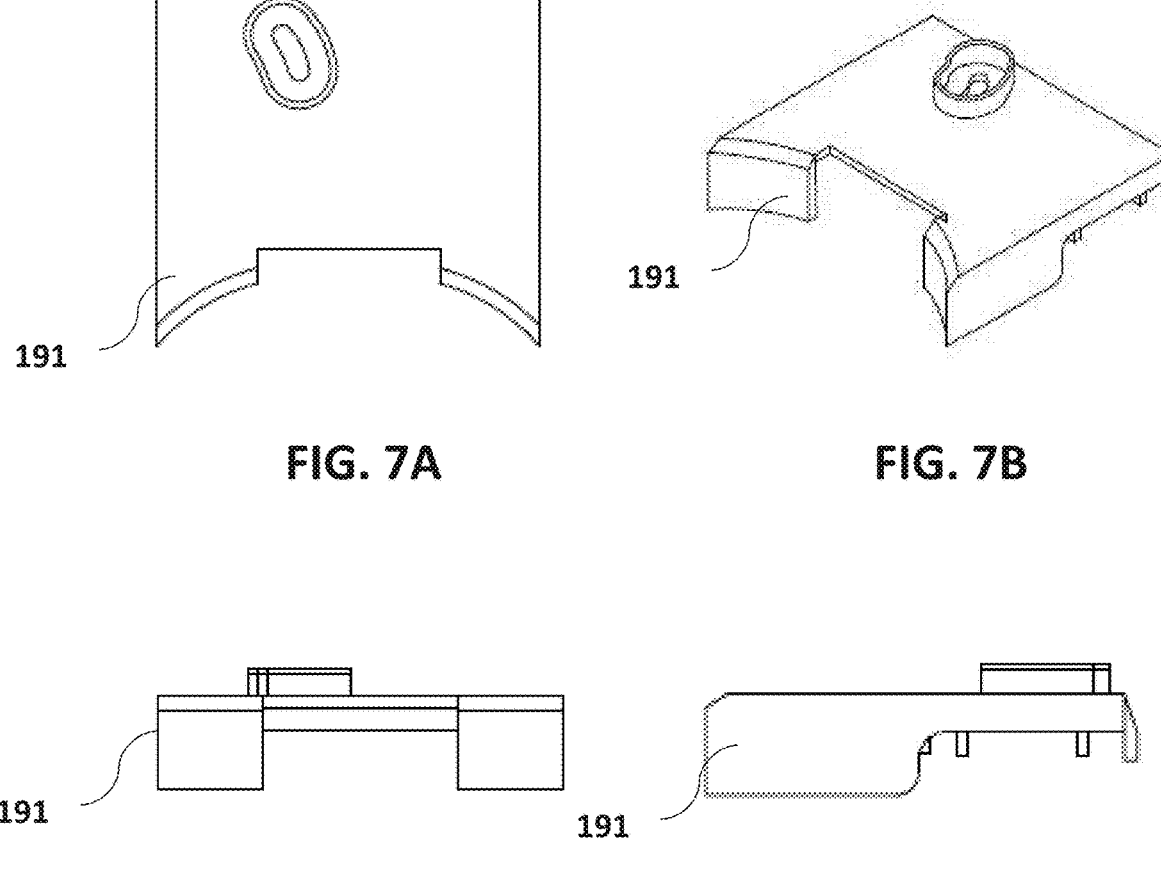
FIG. 7A shows a top view of a feed house cap of the embodiment of FIG. 1.
FIG. 7B shows a perspective view of the feed house cap of FIG. 7A.
FIG. 7C shows a front view of the feed house cap of FIG. 7A.
FIG. 7D shows a side view of the feed house cap of FIG. 7A.
Figures 9A, 9B, 9C, 9D:
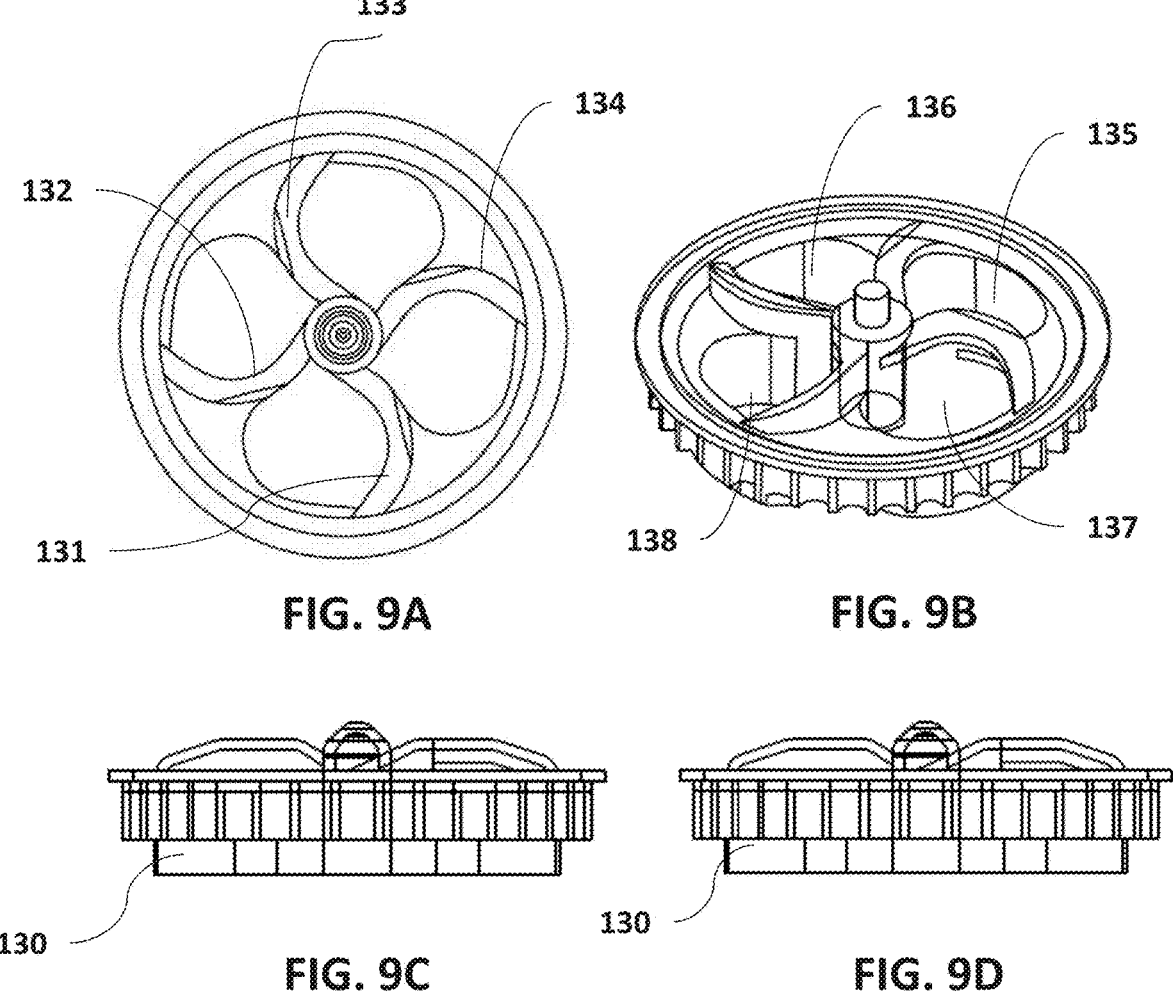
FIG. 9A shows a top view of a feed wheel of the embodiment of FIG. 1.
FIG. 9B shows a perspective view of the feed wheel of FIG. 9A.
FIG. 9C shows a front view of the feed wheel of the embodiment of FIG. 9A.
FIG. 9D shows a side view of the feed wheel of the embodiment of FIG. 9A.
Figures 10A, 10B:
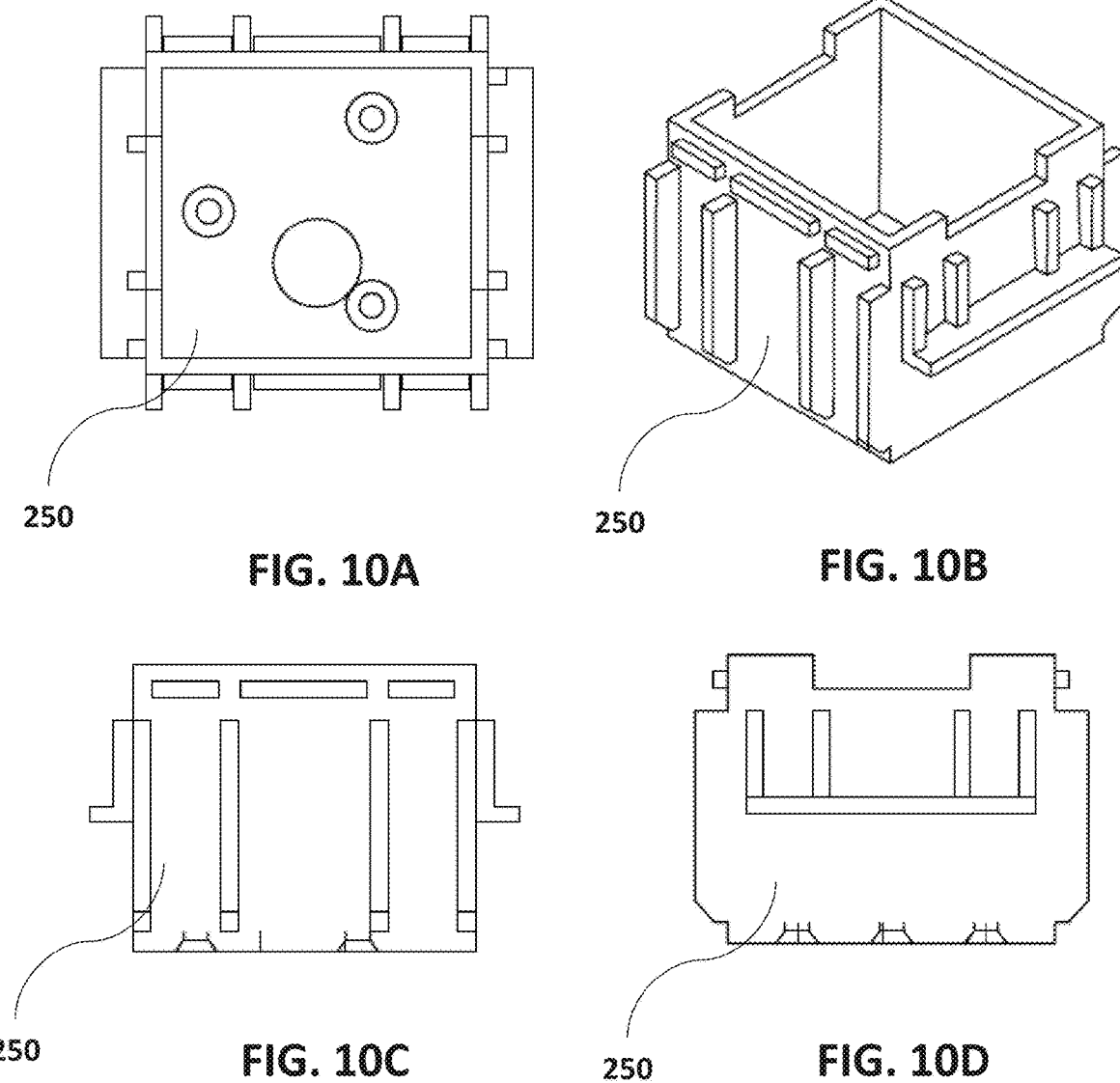
FIG. 10A shows a top view of a first side of a motor house of the embodiment of FIG. 1.
FIG. 10B shows a perspective view of the first side of FIG. 10A.

FIG. 6 shows a drive assembly 165. The drive assembly 165 is comprised of a motor 160, a first side of the motor housing 161, a second side of the motor housing 162, a third side of the motor housing 250, a cog 260, and a motor hinge 163. The motor 160 in some embodiments comprises a DC or AC, single or variable speed, motor.

FIGS. 10A-D show a first side of the motor housing 161 of an embodiment of the present invention. FIGS. 12A-D show a second side 162 of the motor housing of an embodiment of the present invention. FIGS. 13A-D show a third side of the motor housing 250 of an embodiment of the present invention. The components of the motor housing are mechanically coupled during operation of the dispensing apparatus assembly 100 to provide a secure compartment containing the motor 160. This ensures the motor will not become agglomerated with any material or particulates that accumulate during operation. FIGS. 14A-D show the motor hinge 163, which is a support bracket located in the drive assembly 165 to support the motor 160. In some embodiments, the motor 160 is operatively coupled to a cog 260. The cog 260 has a plurality of protrusions around its circumference that engage with a plurality of protrusions around the circumference of the feed wheel 130 to drive the feed wheel.

FIGS. 8A-D show additional detail of feed house collars 111-112 of the feed house assembly 110 described above. The feed house assembly 110 is operatively constructed from a first feed house collar 111 and a second feed house collar 112 of molded plastic, however other materials may be used, including but not limited to polycarbonate or another similar thermoplastic plastic or metal. The funnel 140, feed wheel 130, and chute 150 (not shown in FIGS. 8A-8D) are housed inside of the first feed house collar 111 and second feed house collar 112.

FIGS. 9A-D shows additional detail of the feed wheel 130 described above. Each half of the feed wheel 130 contains four sweeping protrusions 131-134 and four dispensing sections 135-138 at one end of the sweeping protrusions 131-134. The sweeping protrusions 131-134 control the amount of the material conveyed and dispensed. Material first passes from the hopper 120 through the funnel 140 (not shown in FIGS. 9A-9D) and is swept into the dispensing sections 135-138 by the sweeping protrusions 131-134. The material then falls via gravity feed from the dispensing sections 135-138 through the chute 150 (not shown in FIGS. 9A-9D) into the user's container. The shape and dimensions of the sweeping protrusions 131-134 are in proportion to the feed house assembly 110 and control the amount of food to be dispensed at each rotation of the feed wheel 130.

In some embodiments, the feed wheel 130 is designed to prevent damming or clogging of the material as it is conveyed from the hopper 120 through the feed house assembly 110, and into the user's container. The sweeping protrusions 131-134 further act as baffles to prevent damming of material during operation of the dispensing apparatus assembly 100.

The feed wheel 130 is substantially vertically disposed about an axis 124 in the feed house assembly 110 as defined by the angle theta 123 (as shown in FIG. 5). In an embodiment, the vertical disposition of the feed wheel reduces damming and agglomeration of material in the feed house assembly 110 and the hopper 120 because it allows direct gravity feed from the hopper 120 through the feed house assembly 110. This improves flow of material from the hopper 120, thereby reducing damming of the material. The sweeping protrusions 131-134 on the feed wheel 130 further act as baffles to ensure smooth flow of material from the hopper 120 through the feed house assembly 110 because of the orientation of the feed wheel 130 as shown in this illustrative embodiment.

Figures 11A, 11B, 11C, 11D:
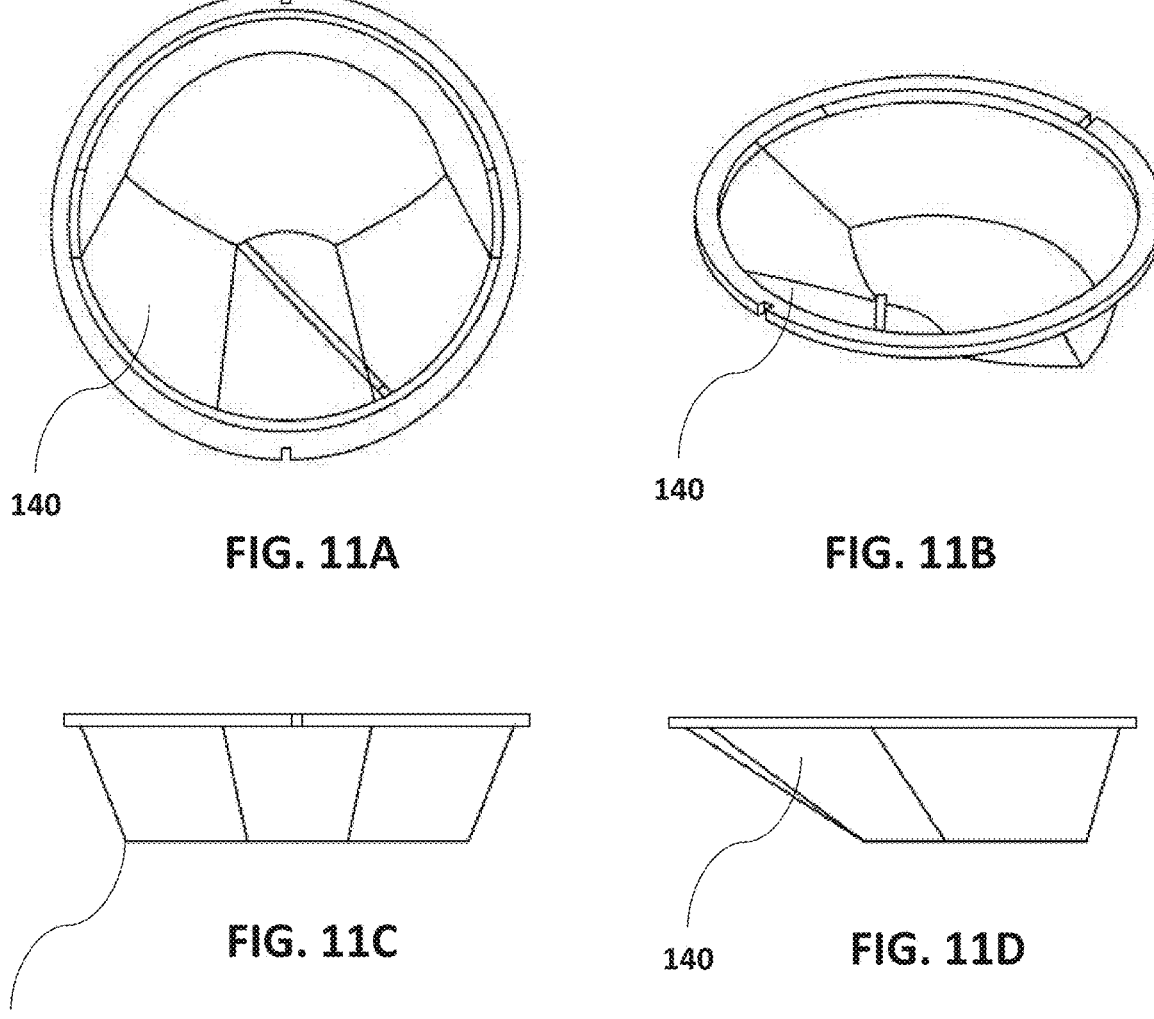
FIG. 11A shows a top view of a funnel of the embodiment of FIG. 1.
FIG. 11B shows a perspective view of the funnel of FIG. 11A.
FIG. 11C shows a front view of the funnel of the embodiment of FIG. 11A.
FIG. 11D shows a side view of the funnel of the embodiment of FIG. 11A.
Figures 12A, 12B, 12C, 12D:
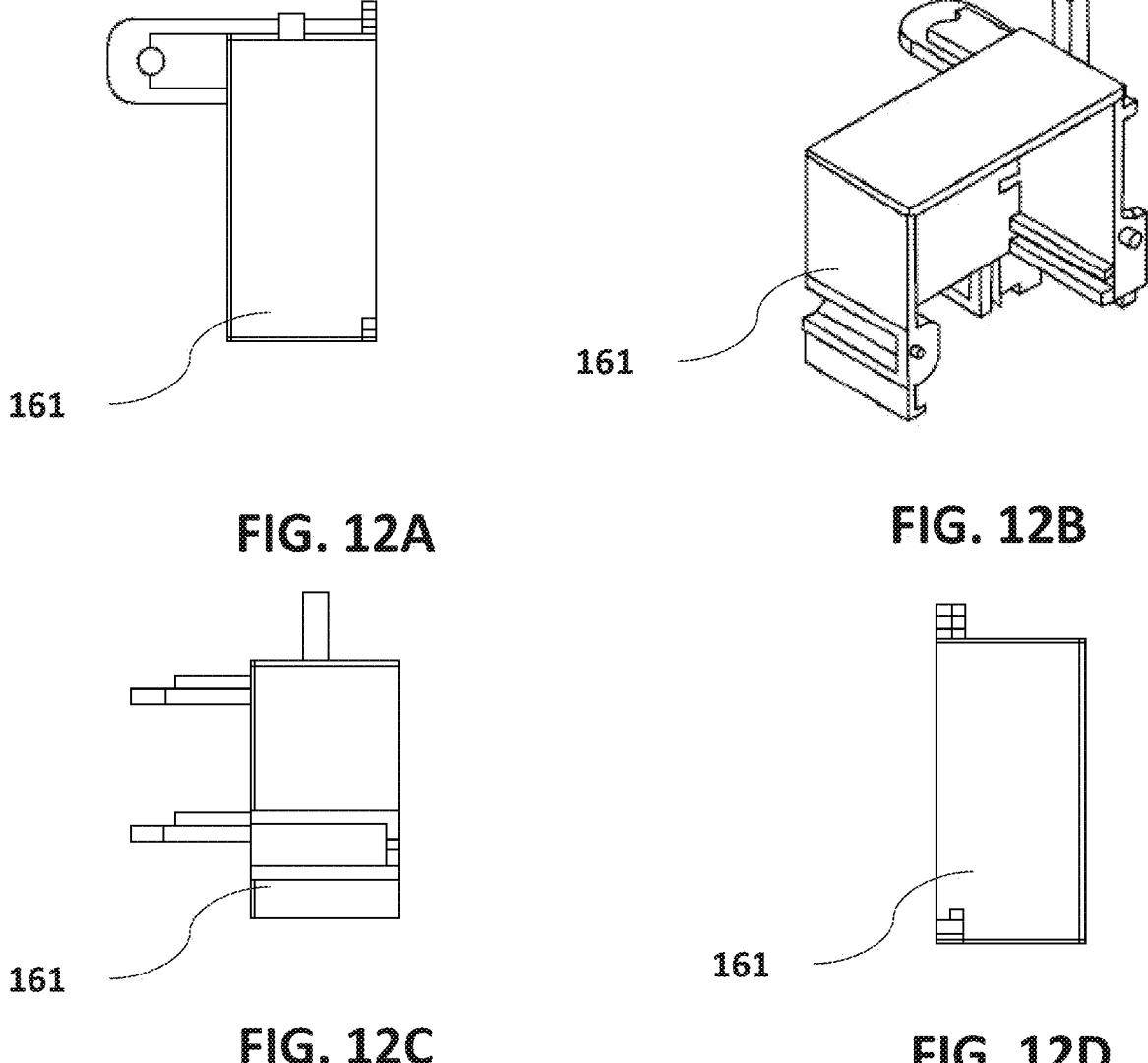
FIG. 12A shows a top view of a second side of a motor house of the embodiment of FIG. 1.
FIG. 12B shows a perspective view of the second side of a motor house of FIG. 12A.
FIG. 12C shows a front view of the second side of a motor house of FIG. 12A.
FIG. 12D shows a side view of the second side of a motor house of FIG. 12A.
Figures 13A, 13B, 13C, 13D:
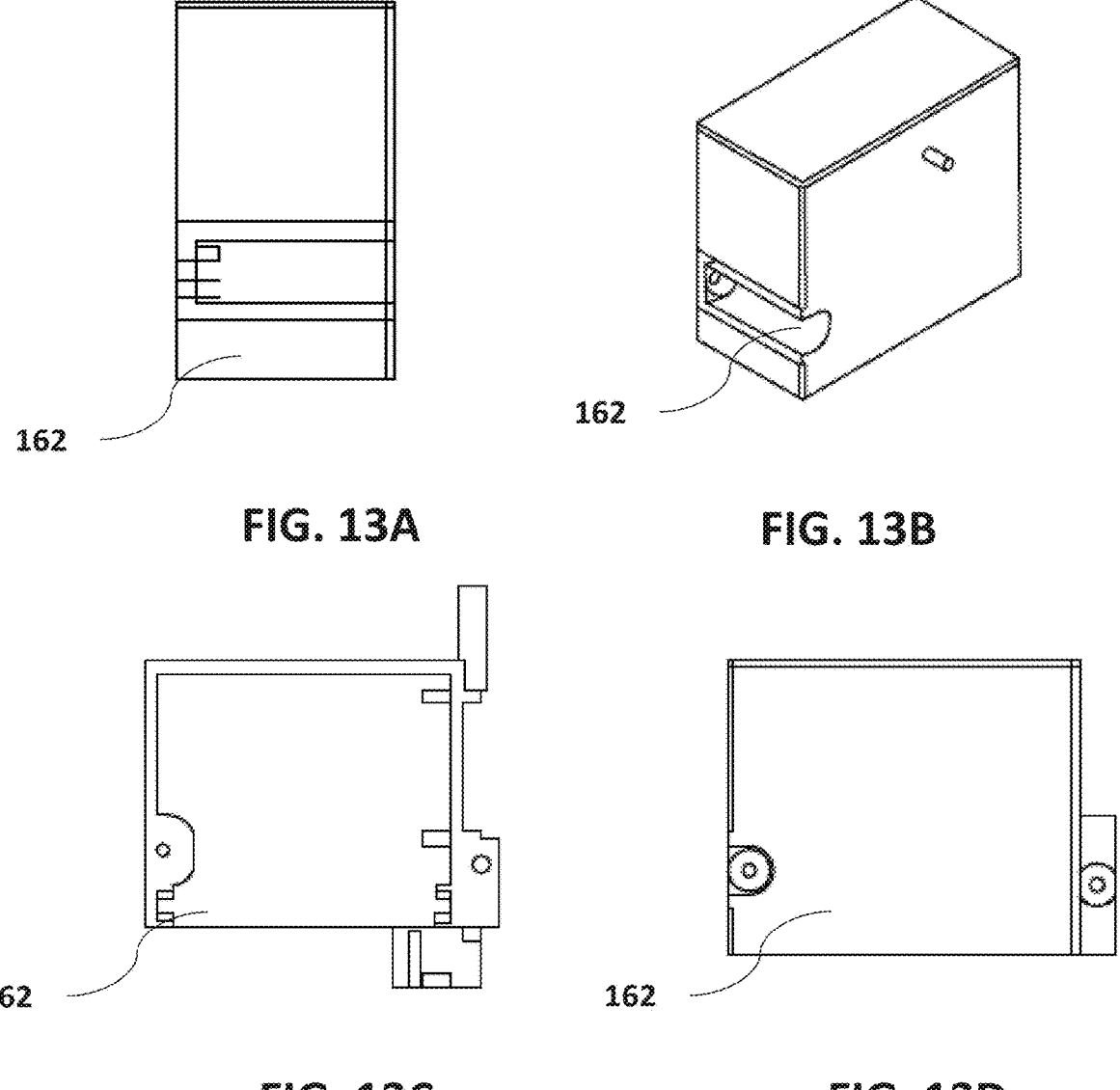
FIG. 13A shows a top view of a third side of a motor house of the embodiment of FIG. 1.
FIG. 13B shows a perspective view of the third side of a motor house of FIG. 13A.
FIG. 13C shows a front view of the third side of a motor house of FIG. 13A.
FIG. 13D shows a side view of the third side of a motor house of FIG. 13A.
Figures 14A, 14B, 14C, 14D:
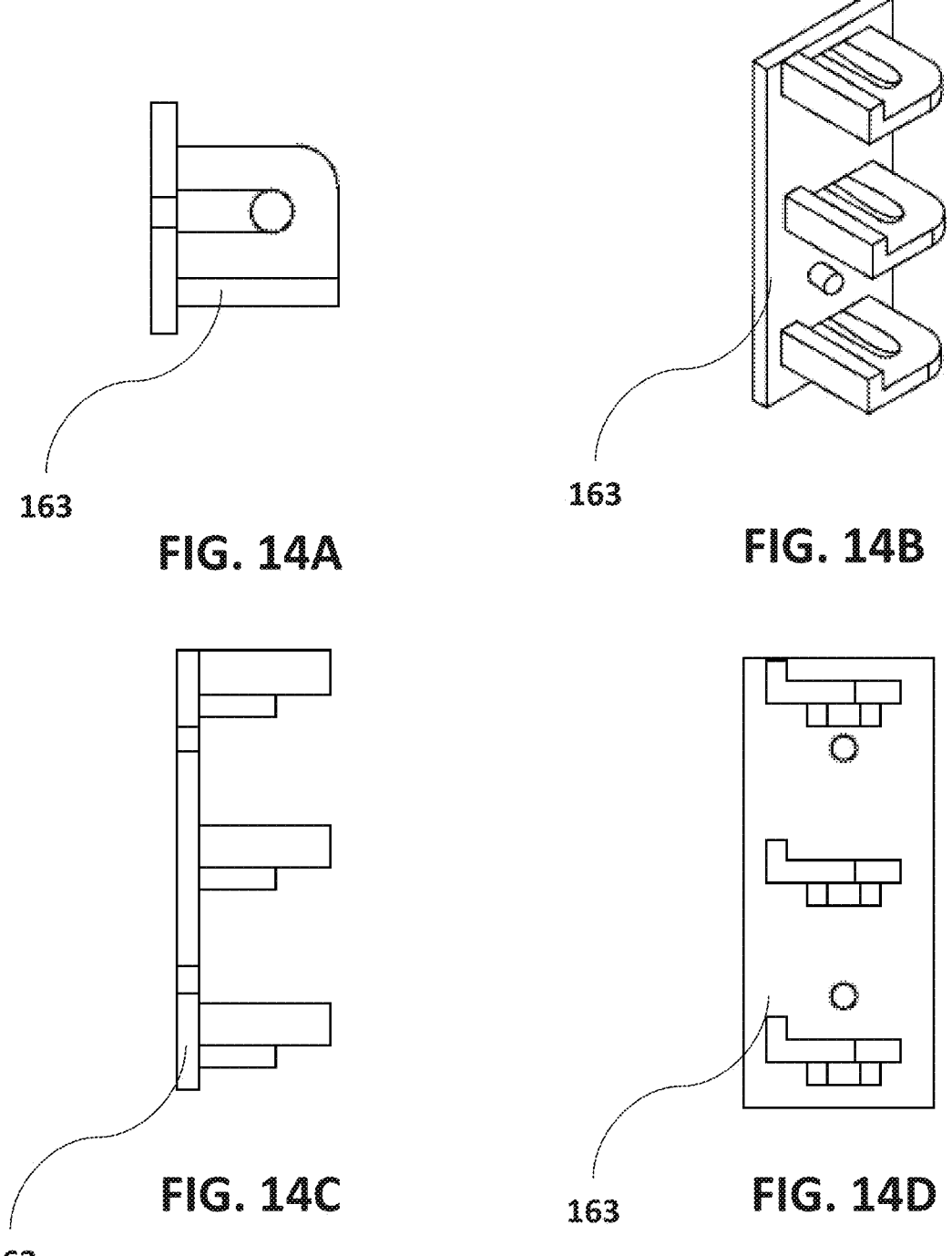
FIG. 14A shows a top view of a motor hinge of the embodiment of FIG. 1.
FIG. 14B shows a perspective view of the motor hinge of FIG. 14A.
FIG. 14C shows a front view of the motor hinge of FIG. 14A.
FIG. 14D shows a side view of the motor hinge of FIG. 14A.
Figures 15A, 15B, 15C, 15D:
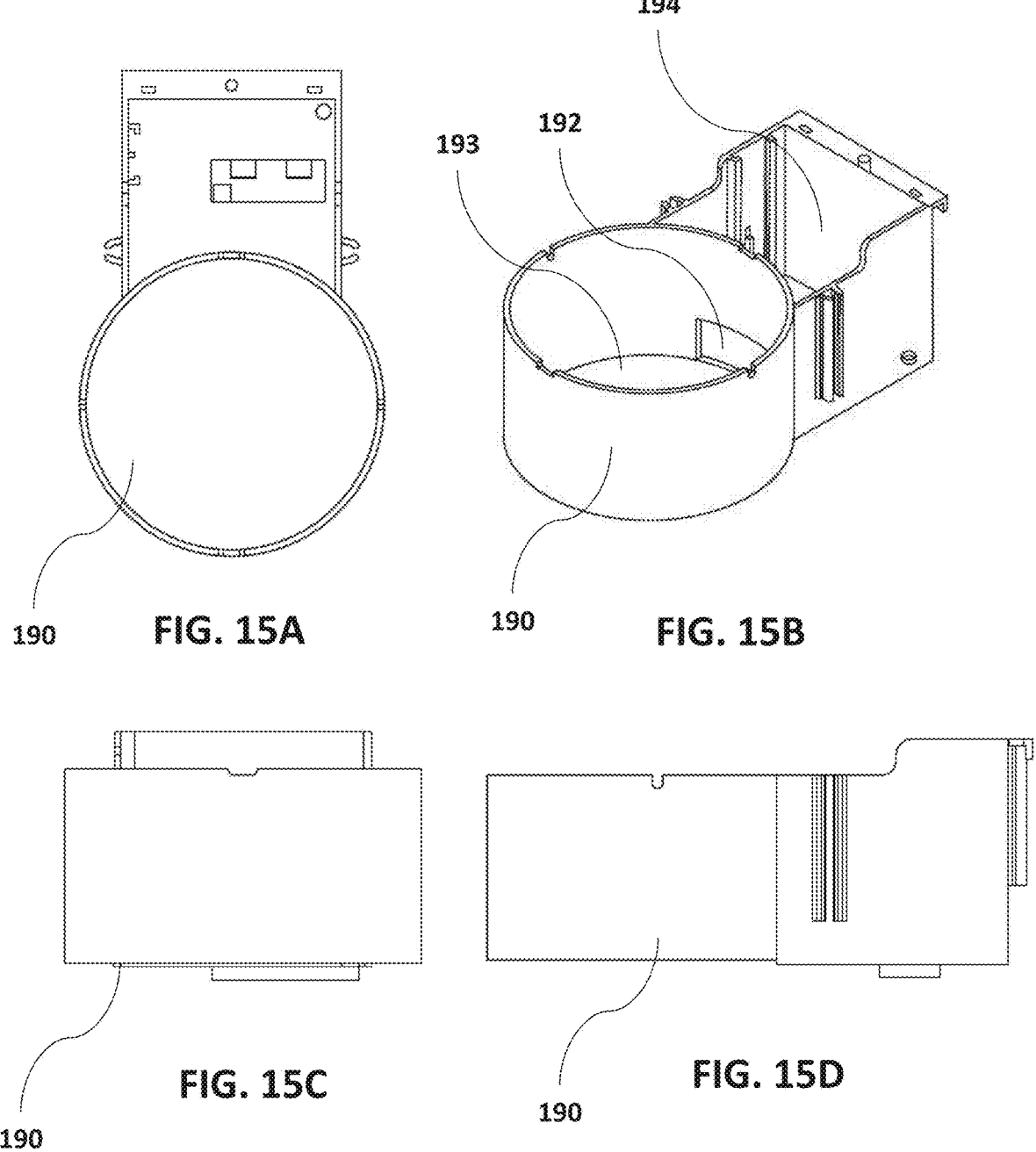
FIG. 15A shows a top view of a saddle of the embodiment of FIG. 1.
FIG. 15B shows a perspective view of the saddle of FIG. 15A.
FIG. 15C shows a front view of the saddle of FIG. 15A.
FIG. 15D shows a side view of the saddle of FIG. 15A.

FIGS. 11A-C show the funnel 140 that channels material from the hopper 120 to the feed wheel 130 (as shown in FIG. 2). The funnel is located in the upper portion of the feed house assembly 110. The funnel 140 allows material to flow smoothly from the hopper 120 into the feed house assembly 110 without damming or agglomeration. Additionally, the funnel 140 works in conjunction with the feed wheel 130 to prevent the aforementioned damming or agglomeration of material in the hopper 120 or feed house assembly 110 ensuring material falls via gravity feed from the hopper 120 smoothly through the feed house 110 and into the users container via the chute 150. This is achieved by the funnel 140 being disposed in such a way that the material in the hopper 120 can fall via gravity fed directly into the feed wheel 130 without obstruction, thereby minimizing agglomeration or damming of the material.

FIGS. 15A-D show the saddle 190. As described above with reference to FIG. 4, the saddle houses the motor assembly 165 in a first part 194 and the feed house assembly 110 in a second part 193. There is a slot 192 between the first part 194 and the second part 193 of the saddle 190 that allows the cog 260 (described above and not shown in FIG. 15) on the motor 160 to make contact with the feed wheel 130. The motor actuates the feed wheel 130 when the lever 200 is depressed. The lever 200 (shown in FIG. 2) extends from the saddle 190 and is coupled to a paddle switch 211 (shown in FIG. 2) that actuates the motor when depressed. The saddle 190 also provides support to the hopper 120 when it is full of material.

In certain embodiments, the lever 200 is operatively coupled to a switch channel 210. FIGS. 16A-D show the switch channel 210. A paddle switch 211 is located inside the switch channel 210. When a container is pressed against the lever 200, the lever 200 depresses and thus closes the paddle switch 211, which permits power to flow to the motor 160, thereby activating it. As previously described, the motor actuates the feed wheel 130. When the hopper 120 is filled with solid material, the solid material is directed to the feed wheel 130, which carries the solid material through the feed house assembly 110 and dispenses it through the chute 150. When the lever 200 is no longer depressed, the paddle switch 211 is opened and the motor 160 stops running.

Although in the embodiments disclosed here the dry food dispenser includes a hopper 120 as a container for the dry food, a person of ordinary skill in the art will appreciate that alternative structures for housing the dry food may be implemented without deviating from the invention. These alternative methods may include a direct feed from a larger container to the hopper 120. Additionally, it is expressly contemplated that the hopper 120 may comprise any number of shapes such as square, rectangular, circular, trapezoidal, or triangular.

One aspect of the present invention is that it is machine-washable and easy to take apart to clean. Materials suitable for machine washing are expressly contemplated for use as materials of construction for the present invention. Additionally, mechanical couplings such as detents are contemplated for use as fasteners because of the ease of assembly and disassembly for cleaning.

Figure 17:
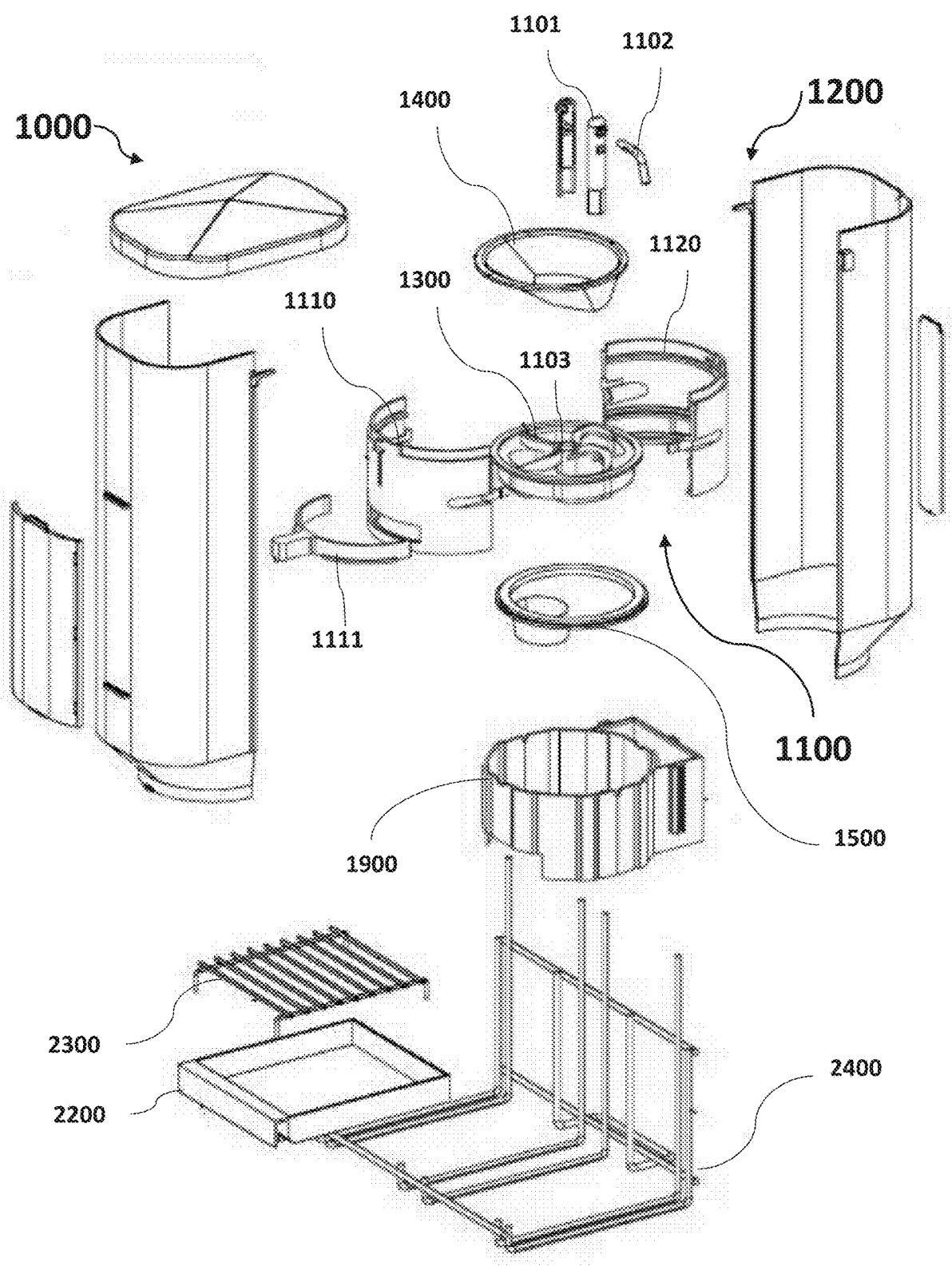
FIG. 17 shows a perspective view of a second embodiment of the present invention.

Turning next to FIG. 17, an exploded view of another embodiment of a dispensing apparatus assembly 1000 is shown. A source container for storing material, shown as a hopper 1200, is located above a feed house assembly 1100. The hopper 1200 contains a cavity in which the material is stored. Material stored in the hopper 1200 is gravity fed from the hopper 1200 to the feed house assembly 1100 in an illustrative embodiment.

In some embodiments, there is a funnel 1400 internal to the feed house assembly 1100 which directs material from the hopper 1200 to a feed wheel 1300. The feed wheel 1300 rotates, dispensing material into the user's container via a chute 1500 located below the feed wheel. The feed house assembly 1100 further comprises a saddle 1900 which contains the components of the feed house assembly 1100 internally. In some embodiments, the feed house assembly 1100 further comprises an agitator 1101. The agitator 1101 is connected to a central hole 1103 within the feed wheel 1300 such that the agitator 1101 rotates as the feed wheel 1300 rotates. The agitator 1101 is comprised of two plastic halves which fit together within the central hole 1103 of the feed wheel 1300. The agitator 1101 rotates at the same speed as the feed wheel 1300. The agitator 1101 further comprises a pin 1102 extending outwardly from the agitator 1101 which rotates with the agitator 1101 to clear any agglomerations of material in the hopper 1200. The agitator 1101 and pin 1102 prevent a build-up of material from forming at the entrance of the funnel 1400.

The feed wheel 1300 is enclosed within two feed house collars 1110-1120. The two feed house collars 1110-1120 may be identical in some embodiments, and fit together via a friction fit or in some embodiments, a detent fit. A person having ordinary skill in the art would realize that any number of different fitment options are available. The feed house assembly 1100 further comprises a feed lever 1111. The feed lever 1111 actuates the feed wheel 1300, which dispenses material from the hopper 1200 into a user receptacle below the chute 1500. The feed lever 1111 may be manually operated.

In other or the same embodiments, the dispensing apparatus assembly 1000 further includes a wire base 2400. The wire base 2400 provides support for the dispensing apparatus assembly 1000. The wire base 2400 supports the hopper 1200 and suspends it above a wire grate 2300 and a removable crumb tray 2200. In some embodiments, the wire grate 2300 is designed to support the user's container as it is filled with material, such as cereal, while permitting excess material to fall through and be captured in the crumb tray 2200. The crumb tray 2200 thereby allows for quick cleaning of the area directly below the opening in the wire grate 2300. Quick cleaning is facilitated by the removal of the wire grate 2300 and crumb tray 2200 from the wire base 2400. Both the wire grate 2300 and crumb tray 2200 can be machine washed and are coupled mechanically to the wire base 2400 to facilitate easy removal with no tools required.

Figure 18:
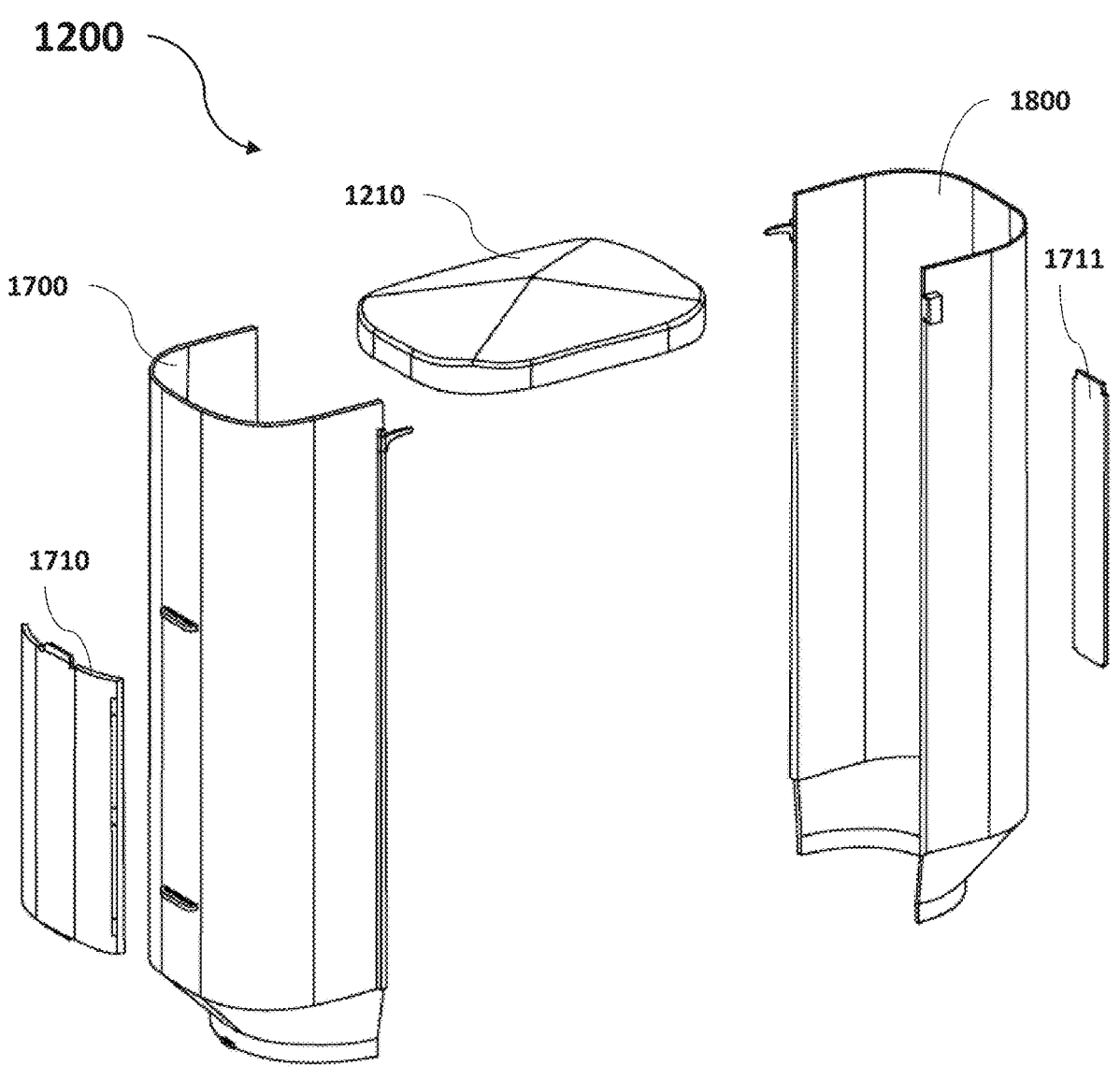
FIG. 18 shows an exploded view of a hopper assembly of the embodiment of FIG. 17.

Turning next to FIG. 18, an exploded view of the hopper 1200 is shown. The hopper 1200 may be comprised of a first side 1700 and a second side 1800 mechanically connected to one another to form an upper storage portion to retain bulk solid material to be dispensed. The hopper first side 1700 and second side 1800 may be semi-circular in shape. Once the hopper 1200 is filled with a material, for instance a cereal, the material is gravity fed through the hopper 1200 to the funnel 1400, which is located in the feed house assembly 1100. The funnel 1400 directs the material housed in the hopper 1200 via gravity towards the feed wheel 1300 in the feed house assembly 1100. Below the feed wheel 1300 is the chute 1500 to direct the flow of the material swept with the feed wheel 1300 to the opening in the chute 1500. There is a removable cap 1210 located atop the hopper 1200 that allows the dispenser apparatus assembly 1000 to be refilled, and prevent contamination of the material when the hopper 1200 is full and in use.

As shown in FIG. 18, in some embodiments, there is a detachable plaque 1710 attached to the first side 1700 of the hopper 1200 that allows information about the material, such as the material's name and branding, to be displayed for the user to see. There is also a filler 1711 on the second side 1800 of the hopper 1711. The hopper 1200 first side 1700 and second side 1800 are identical to facilitate ease of manufacturing, but a label is only required on one side, therefore, a filler 1711 may be used on the non-labeled second side 1800 of the hopper.

Figure 19:
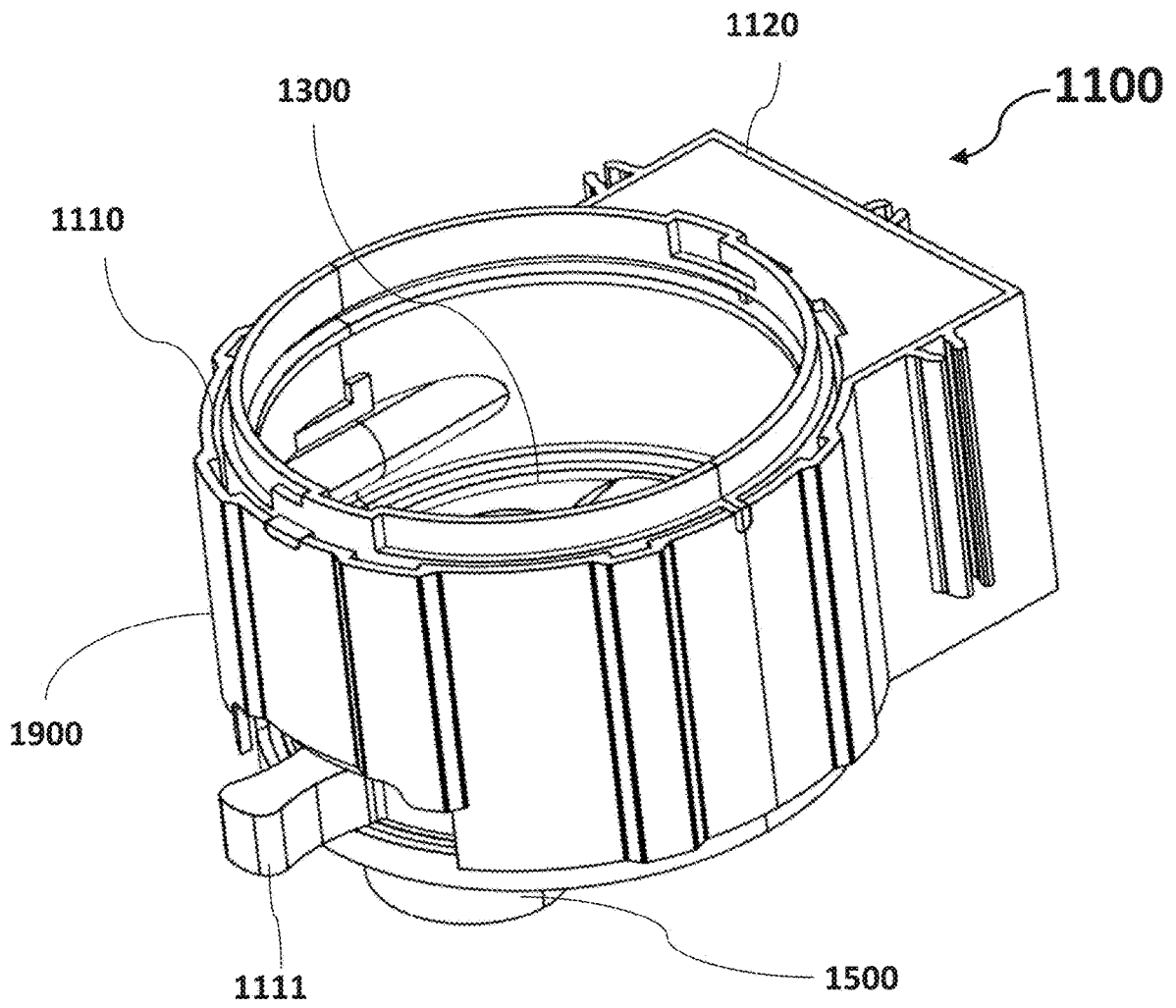
FIG. 19 shows a perspective view of a feed house assembly of the embodiment of FIG. 17.

FIG. 19 shows a perspective view of a feed house assembly 1100 of the embodiment of FIG. 17 omitting the funnel 1400. Material from the hopper 1200 is channeled into the feed house assembly 1100 where the feed wheel 1300, encased within the two feed house collars 1110-1120, dispenses the material via the chute 1500 into a receptacle. The feed house collars 1110-1120 and feed wheel 1300 are encased within the saddle 1900. The feed wheel 1300 is actuated via the feed lever 1111. The feed lever 1111 actuates the feed wheel 1300, which dispenses material from the hopper 1200 to a receptacle below the chute 1500.

Figure 20:
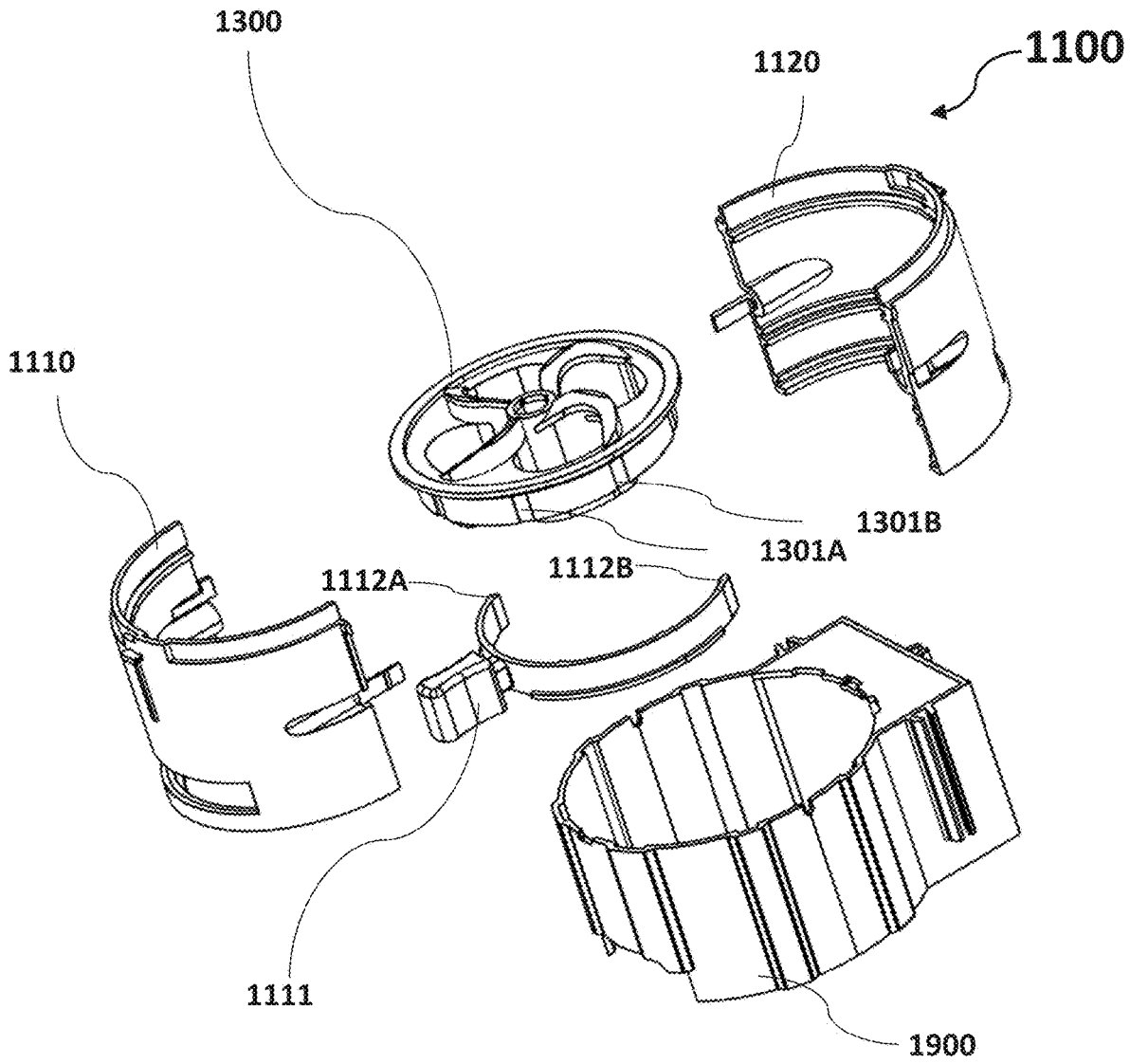
FIG. 20 shows an exploded view of a feed house assembly of the embodiment of FIG. 17.
Figures 23A, 23B, 23C, 23D:
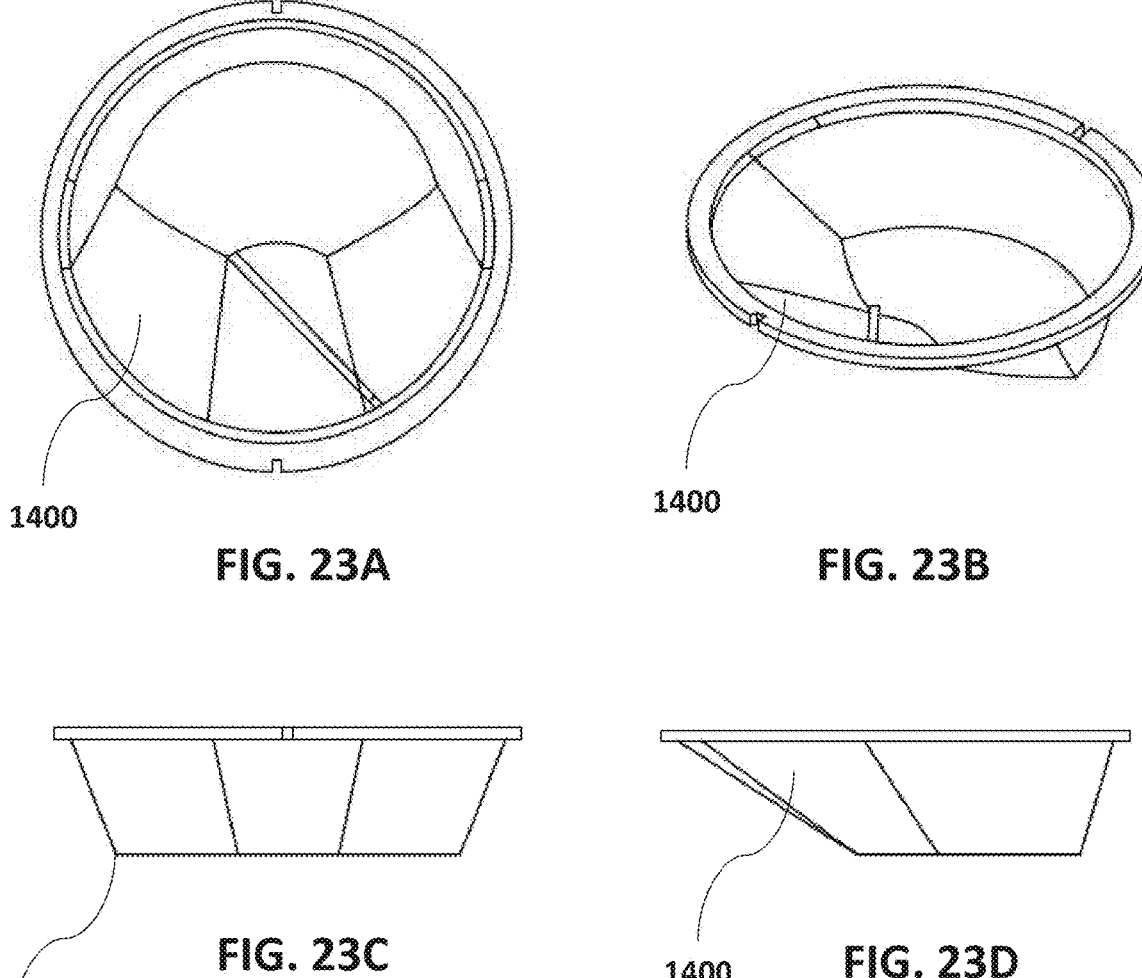
FIG. 23A shows a top view of a funnel of the embodiment of FIG. 17.
FIG. 23B shows a perspective view of the funnel of FIG. 23A.
FIG. 23C shows a front view of the funnel of the embodiment of FIG. 23A.
FIG. 23D shows a side view of the funnel of the embodiment of FIG. 23A.

Turning next to FIG. 20, an exploded view of the feed house assembly 1100 is shown, omitting the funnel 1400 and the chute 1500. The feed wheel 1300, feed house collars 1110-1120, feed lever 1111, and saddle 1900 are shown. The feed wheel 1300 further comprises a series of notches 1301A-B disposed about the periphery of the feed wheel 1300. The notches 1301A-B are engaged by two protrusions 1112A-B located at each end of the feed lever 1111. As the feed lever 1111 is moved horizontally, the protrusions 1112A-B on the feed lever 1111 engage the notches 1301A-B of the feed wheel 1300 such that the feed wheel 1300 rotates. The protrusions 1112A-B on the feed lever 1111 are different lengths. Actuating the feed lever 1111, and thereby moving the feed wheel 1300, dispenses material from the hopper 1200 into a user receptacle located below the feed wheel 1300.

FIGS. 21A-D show the feed house collars 1110-1120 in more detail. The feed house collars 1110-1120 are identical, and further comprise a slot 1121 which allows for the feed lever 1111 to protrude from the front of the feed house assembly 1100. This allows a user to engage the feed lever 1111 to dispense material from the hopper 1200 into a receptacle via the feed house assembly 1100.

FIGS. 22A-C show additional detail of the feed wheel 1300 described above. Each half of the feed wheel 1300 contains four sweeping protrusions 1310-1340 and four dispensing sections 1350-1380 at one end of the sweeping protrusions 1310-1340. The sweeping protrusions 1310-1340 control the amount of the material conveyed and dispensed. Material first passes from the hopper 1200 through the funnel 1400 (not shown in FIGS. 22A-C) and is swept into the dispensing sections 1350-1380 by the sweeping protrusions 1310-1340. The material then falls via gravity feed from the dispensing sections 1350-1380 through the chute 1500 (not shown in FIGS. 22A-C) into the user's container. The shape and dimensions of the sweeping protrusions 1310-1340 are in proportion to the feed house assembly 1100 and control the amount of food to be dispensed at each rotation of the feed wheel 1300. The series of notches 1301A-B disposed about the periphery of the feed wheel 1300 are also shown. The feed lever 1111 (not shown in FIGS. 22A-C), which has two protrusions 1112A-B (not shown in FIGS. 22A-C), engages the series of notches 1301A-B to rotate the feed wheel 1300, dispensing material.

Additionally, shown in FIG. 22B, the notches 1301A-B on the feed wheel 1300 have a rounded portion 1381 and a flat portion 1382. The feed lever 1111 is a unidirectional manually actuated lever because the protrusions 1112A-B of the feed lever 1111 "push" on the flat portion 1382 to advance the feed wheel 1300 only in one direction. The protrusions 1112A-B further "slip" over the rounded portion 1381 of the notches 1301A-B to prevent advancing the feed wheel 1300 in a second direction. When the feed wheel 1300 is moved in a second direction, opposite the first direction, the protrusions 1112A-B slip over the rounded portions 1381 of the feed wheel 1300 such that movement of the feed lever 1111 in the second direction does not rotate the feed wheel 1300. This unidirectional movement prevents damaging or otherwise crushing the material in the hopper 1400 by the feed wheel 1300 during operation.

FIGS. 23A-D show the funnel 1400 that channels material from the hopper 1200 to the feed wheel 1300 (as shown in FIGS. 22A-C). The funnel is located in the upper portion of the feed house assembly 1100. The funnel 1400 allows material to flow smoothly from the hopper 1200 into the feed house assembly 1100 without damming or agglomeration. Additionally, the funnel 1400 works in conjunction with the feed wheel 1300 to prevent the aforementioned damming or agglomeration of material in the hopper 1200 or feed house assembly 1100 ensuring material falls via gravity feed from the hopper 1200 smoothly through the feed house 1100 and into the users container via the chute 1500. This is achieved by the funnel 1400 being disposed in such a way that the material in the hopper 1200 can fall via gravity fed directly into the feed wheel 1300 without obstruction, thereby minimizing agglomeration or damming of the material.

Figure 24A:
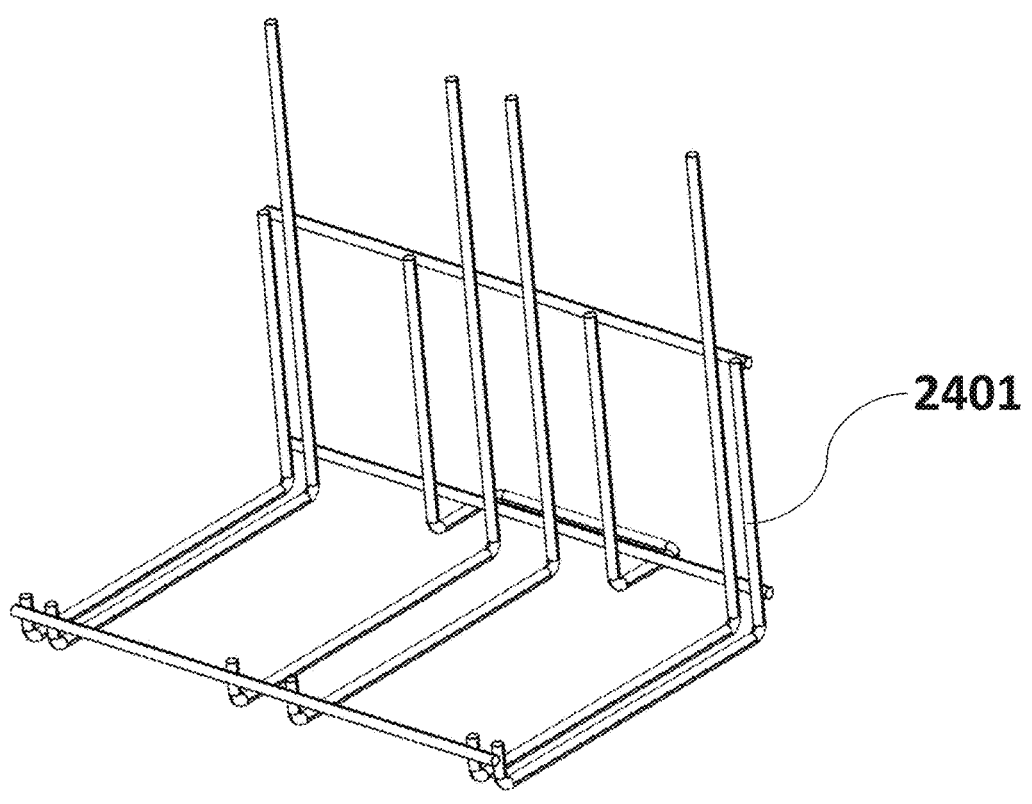
FIG. 24A shows a perspective view of a dual-unit wire base.
Figure 24B:
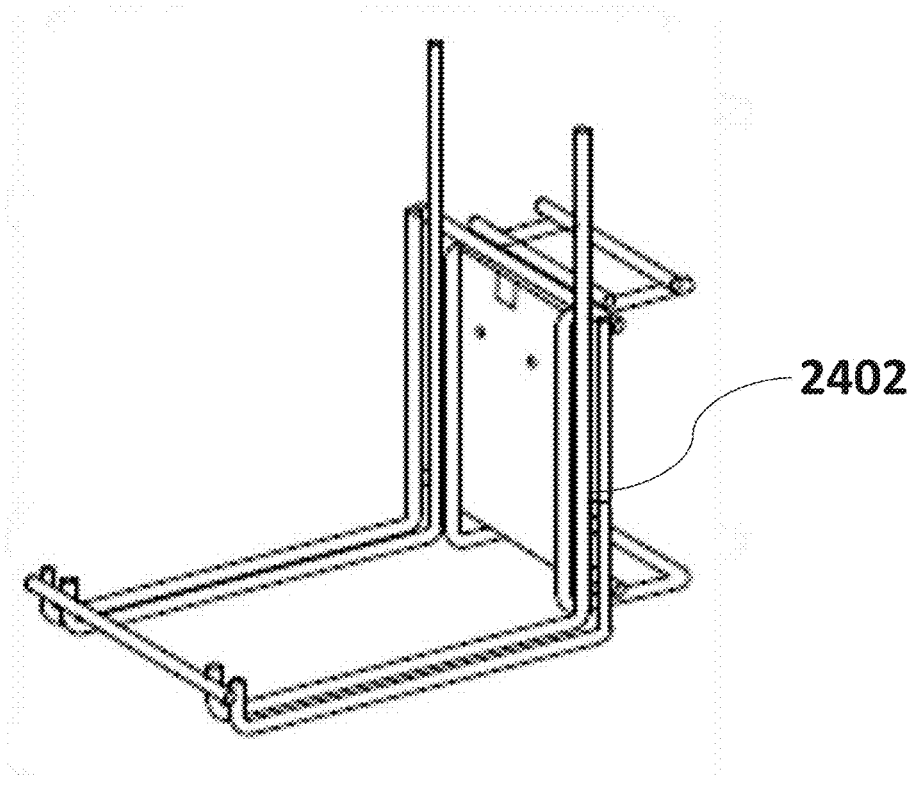
FIG. 24B shows a perspective view of a single-unit wire base.

Turning next to FIG. 24A, a dual-unit wire base 2401 is shown. The dual-unit wire base 2401 allows for the mounting of dual dispensing apparatus assemblies 1000 next to each other on a single frame. This is advantageous in setting where multiple different types of material are to be dispensed simultaneously, or the user desires a larger variety of materials to select from. FIG. 24B shows a single-unit wire base 2402. The single-unit wire base 2402 allows for the mounting of a single dispensing apparatus assembly 1000. This layout is advantageous for smaller spaces or in circumstances where less material is required to be dispensed from the dispensing apparatus assembly 1000.

It is to be understood that the invention is not limited to the exact details of construction, operation, exact materials or embodiments shown and described, as obvious modifications and equivalents will be apparent to one skilled in the art. While the specific embodiments have been illustrated and described, numerous modifications come to mind without significantly departing from the spirit of the invention, and the scope of protection is only limited by the scope of the accompanying Claims.

We claim:

1. A bulk food dispenser including:
a source container for bulk food;
a feed house assembly in communication with the source container;
a funnel configured to direct the bulk food from the source container to the feed house assembly;
a feed wheel with an axis substantially parallel to the axis of the source container, wherein the feed wheel further includes a plurality of protrusions configured to direct the bulk food out of the feed house assembly;
a unidirectional manually actuated lever operatively coupled to the feed wheel;
wherein the unidirectional manually actuated lever is configured to actuate the feed wheel, a saddle configured to support and encase the feed wheel;
wherein the saddle comprises a slot for the unidirectional manually actuated lever to protrude from and engage the feed wheel,
wherein the unidirectional manually actuated lever has a second plurality of protrusions that engage a plurality of notches on the feed wheel, and
wherein the source container is comprised of two curved walls coupled mechanically to each other.

2. The bulk food dispenser of claim 1, wherein the feed wheel comprises four protrusions.

3. The bulk food dispenser of claim 2, wherein the feed wheel further comprises four openings.

4. The bulk food dispenser of claim 1, wherein the feed house assembly further comprises a chute configured to deliver bulk food from the feed house assembly to a container, and at least one feed collar to seal the assembly.

5. The bulk food dispenser of claim 1, wherein the source container is a hopper located above the feed house assembly for containing the flowable bulk food.

6. The bulk food dispenser of claim 1, wherein the source container is coupled to the saddle.

7. The bulk food dispenser of claim 1, wherein the source container is substantially cylindrical.

8. The bulk food dispenser of claim 1, wherein the two curved walls coupled mechanically to each other further comprise semi-circular walls.

9. The bulk food dispenser of claim 1, further comprising an agitator operatively coupled to a hole within the feed wheel and configured to agitate material in the source container.

10. A bulk breakfast cereal dispenser, comprising:
a cavity defined by a source container;
a funnel disposed at a base of the cavity configured to direct the flow of the flowable bulk breakfast cereal out of the storage container;
a feed house comprising a mechanism for dispensing the flowable bulk breakfast cereal;

a feed wheel comprising a plurality of openings config- ured to allow passage of breakfast cereal from the funnel, the openings adjacent to a plurality of protru- sions, wherein the feed wheel is manually driven and the central axis of the feed wheel is substantially parallel to the axis of the storage container;

a chute configured to direct the breakfast cereal from the feed wheel into a user's container disposed below the chute;

a saddle configured to support and encase the feed;

wherein the saddle comprises a slot for a unidirectional manually actuated lever to protrude from and engage the feed wheel, wherein a second plurality of protrusions on the uni- directional manually actuated lever engage a plural- ity of notches on the feed wheel, and wherein the source container is comprised of two curved walls coupled mechanically to each other.

11. The bulk breakfast cereal dispenser of claim 10, wherein the unidirectional manually actuated lever is opera- tively connected to the feed wheel to cause the feed wheel to turn when the unidirectional manually actuated lever is actuated.

12. The bulk breakfast cereal dispenser of claim 10, wherein the protrusions on the feed wheel extend upward from a top surface of the feed wheel to act on bulk food when the feed wheel is driven by the unidirectional manu- ally actuated lever.

13. The bulk breakfast cereal dispenser of claim 10, wherein each of the protrusions on the feed wheel is posi- tioned adjacent one or more of the openings in the feed wheel.

14. The bulk breakfast cereal dispenser of claim 10, wherein the two curved walls coupled mechanically to each other further comprise semi-circular walls.

15. The bulk food dispenser of claim 10, further com- prising an agitator operatively coupled to a hole within the feed wheel and configured to agitate material in the source container.

16. A bulk food dispenser comprising:

a source container for bulk food;

a funnel configured to direct the bulk food from the source container towards a feed wheel with an axis substantially parallel to the axis of the source con- tainer, wherein the feed wheel further includes a plurality of protrusions configured to direct the bulk food through one or more openings in the feed wheel;

a unidirectional manually actuated lever operatively coupled to the feed wheel;

a saddle configured to support and encase the feed wheel;

wherein the saddle comprises a slot for the unidirec- tional manually actuated lever to protrude from and engage the feed wheel, wherein the unidirectional manually actuated lever has a second plurality of protrusions that engage a plurality of notches on the feed wheel, and wherein the source container is comprised of two curved walls coupled mechanically to each other.

17. The bulk food dispenser of claim 16, wherein the two curved walls coupled mechanically to each other further comprise semi-circular walls.

18. The bulk food dispenser of claim 16, further com- prising an agitator operatively coupled to a hole within the feed wheel and configured to agitate material in the source container.

* * * * *